US012755493B2

(12) United States Patent
Cartwright et al.

(10) Patent No.: US 12,755,493 B2
(45) Date of Patent: Oct. 6, 2026

(54) AUGMENTED REALITY MOOD BOARD MANIPULATION

(71) Applicant: Snap Inc., Santa Monica, CA (US)

(72) Inventors: Luke Cartwright, New York, NY (US); Matthew Hallberg, Los Angeles, CA (US); Dmytro Kucher, Marina Del Rey, CA (US); Xiao Li, Bellevue, WA (US); Shaun Stelmack, Santa Monica, CA (US); Jiyang Zhu, Bellevue, WA (US)

(73) Assignee: Snap Inc., Santa Monica, CA (US)

( * ) Notice: Subject to any disclaimer, the term of this patent is extended or adjusted under 35 U.S.C. 154(b) by 346 days.

(21) Appl. No.: 18/312,421

(22) Filed: May 4, 2023

(65) Prior Publication Data

US 2024/0371110 A1 Nov. 7, 2024

(51) Int. Cl.

*G06T 19/00* (2011.01)
*G02B 27/01* (2006.01)
*G06F 3/01* (2006.01)

(52) U.S. Cl.

CPC .......... *G06T 19/006* (2013.01); *G02B 27/017* (2013.01); *G06F 3/017* (2013.01)

(58) Field of Classification Search

CPC ..... G06T 19/006; G02B 27/017; G06F 3/017; G06F 3/04815; G06F 3/0482; G06F 3/04845; G06F 3/04883; G06F 3/011

See application file for complete search history.

(56) References Cited

U.S. PATENT DOCUMENTS

| | | | | |
|---|---|---|---|---|
| 7,971,156 | B2 | 6/2011 | Albertson et al. | |
| 7,996,793 | B2 | 8/2011 | Latta et al. | |
| 8,487,938 | B2 | 7/2013 | Latta et al. | |
| 8,856,691 | B2 | 10/2014 | Geisner et al. | |
| 8,912,979 | B1 * | 12/2014 | Gomez | G06F 3/012 345/7 |
| 9,225,897 | B1 | 12/2015 | Sehn et al. | |
| 9,230,160 | B1 | 1/2016 | Kanter | |

(Continued)

FOREIGN PATENT DOCUMENTS

| | | |
|---|---|---|
| CN | 103049761 | 8/2016 |
| EP | 3707693 | 9/2020 |

(Continued)

OTHER PUBLICATIONS

"International Application Serial No. PCT/US2024/026412, International Search Report mailed Aug. 30, 2024", 5 pgs.

(Continued)

*Primary Examiner* — Motilewa Good-Johnson

(74) *Attorney, Agent, or Firm* — Schwegman Lundberg & Woessner, P.A.

(57) ABSTRACT

A method for manipulating a gallery of extended reality (XR) media items displayed in a field of view of the head-worn device. The gallery of XR media items is associated with an anchor user interface element. User selection input is detected at a perceived location of the anchor user interface element. Subsequent user motion input moves the perceived location or orientation of the gallery of XR media items in the field of view of the head-worn device. Rotation or translation of the anchor user interface elements results in a corresponding rotation and/or translation of all of the items in the gallery of XR media items.

20 Claims, 14 Drawing Sheets

(56) References Cited

U.S. PATENT DOCUMENTS

| | | | |
|---|---|---|---|
| 9,276,886 | B1 | 3/2016 | Samaranayake |
| 9,432,314 | B2 * | 8/2016 | Thomas .............. G06F 3/04817 |
| 9,633,080 | B2 * | 4/2017 | Cai ....................... G06F 16/185 |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,175,848 | B2 * | 1/2019 | Haapsaari ........... G06F 3/04883 |
| 10,284,508 | B1 | 5/2019 | Allen et al. |
| 10,402,081 | B1 * | 9/2019 | Andersen ............ G06F 3/04883 |
| 10,439,972 | B1 | 10/2019 | Spiegel et al. |
| 10,475,246 | B1 | 11/2019 | Gribetz et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,614,855 | B2 | 4/2020 | Huang |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,023,035 | B1 | 6/2021 | Atlas et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 * | 10/2021 | Rodriguez, II ......... G06F 3/011 |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,531,402 | B1 | 12/2022 | Stolzenberg |
| 11,546,505 | B2 | 1/2023 | Canberk |
| 11,748,939 | B1 * | 9/2023 | Swanson ................. G06F 3/011 345/427 |
| 12,141,415 | B2 * | 11/2024 | Stolzenberg .......... G06F 3/0482 |
| 12,229,342 | B2 * | 2/2025 | Goodrich .............. G06F 3/0482 |
| 12,360,608 | B2 * | 7/2025 | Reisman ................. G06F 3/015 |
| 2009/0012788 | A1 | 1/2009 | Gilbert et al. |
| 2011/0301934 | A1 | 12/2011 | Tardif |
| 2014/0171036 | A1 | 6/2014 | Simmons |
| 2014/0375683 | A1 | 12/2014 | Salter et al. |
| 2015/0120293 | A1 | 4/2015 | Wohlert et al. |
| 2015/0302625 | A1 * | 10/2015 | Greco ..................... G06F 3/011 345/633 |
| 2015/0370320 | A1 | 12/2015 | Connor |
| 2017/0123487 | A1 | 5/2017 | Hazra et al. |
| 2017/0277684 | A1 | 9/2017 | Dharmarajan Mary |
| 2017/0277685 | A1 | 9/2017 | Takumi |
| 2017/0351910 | A1 | 12/2017 | Elwazer et al. |
| 2018/0143748 | A1 * | 5/2018 | Ahmed .............. H04N 21/4622 |
| 2018/0158370 | A1 | 6/2018 | Pryor |
| 2018/0329209 | A1 * | 11/2018 | Nattukallingal ....... G02B 27/01 |
| 2019/0094981 | A1 * | 3/2019 | Bradski ................ G06V 40/168 |
| 2019/0197785 | A1 * | 6/2019 | Tate-Gans ............. G06T 19/006 |
| 2019/0313059 | A1 * | 10/2019 | Agarawala .............. G06F 3/011 |
| 2020/0320794 | A1 * | 10/2020 | Huang .................... G06F 3/147 |
| 2020/0387286 | A1 * | 12/2020 | Ravasz ................. G06F 3/0482 |
| 2021/0011612 | A1 | 1/2021 | Dancie et al. |
| 2021/0074016 | A1 | 3/2021 | Li et al. |
| 2021/0166732 | A1 | 6/2021 | Shaburova et al. |
| 2021/0174034 | A1 | 6/2021 | Retek et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0354038 | A1 * | 11/2021 | Bar-Zeev ................ G06F 3/017 |
| 2021/0382564 | A1 | 12/2021 | Blachly et al. |
| 2021/0397000 | A1 | 12/2021 | Rodriguez, II |
| 2021/0405761 | A1 | 12/2021 | Canberk |
| 2022/0057922 | A1 * | 2/2022 | Wang .................. G06F 3/04847 |
| 2022/0188539 | A1 | 6/2022 | Chan et al. |
| 2022/0189075 | A1 | 6/2022 | Lynch et al. |
| 2022/0197393 | A1 | 6/2022 | Goodrich et al. |
| 2022/0206588 | A1 * | 6/2022 | Canberk ............... G06F 3/0304 |
| 2022/0229535 | A1 * | 7/2022 | Evangelista ........... H04N 7/147 |
| 2022/0300730 | A1 | 9/2022 | Eirinberg et al. |
| 2022/0300731 | A1 | 9/2022 | Eirinberg et al. |
| 2022/0326781 | A1 | 10/2022 | Hwang et al. |
| 2022/0334649 | A1 | 10/2022 | Hwang et al. |
| 2022/0374131 | A1 * | 11/2022 | Stolzenberg .......... G06F 1/1692 |
| 2022/0374132 | A1 * | 11/2022 | Stolzenberg ........ G06F 3/04815 |
| 2023/0221833 | A1 * | 7/2023 | Holder ............... G02B 27/0093 715/716 |
| 2023/0230328 | A1 | 7/2023 | Assouline et al. |
| 2023/0316634 | A1 * | 10/2023 | Chiu ....................... G06F 3/017 345/156 |
| 2023/0333644 | A1 * | 10/2023 | Cazamias ............... G06F 3/167 |
| 2024/0053873 | A1 * | 2/2024 | Riddle ................ G06F 3/04845 |
| 2024/0104870 | A1 * | 3/2024 | Fuste Lleixa ....... G06F 3/04842 |
| 2024/0134907 | A1 * | 4/2024 | Hristova ............... G06F 16/683 |
| 2024/0281107 | A1 * | 8/2024 | Rai ....................... G06F 3/0486 |
| 2024/0370159 | A1 * | 11/2024 | Cartwright ................ G06T 3/40 |
| 2024/0406368 | A1 * | 12/2024 | Lemay ................. H04N 13/296 |
| 2025/0076645 | A1 * | 3/2025 | Sulyok ............... G02B 27/0018 |
| 2025/0110563 | A1 * | 4/2025 | Araujo .................. G06F 3/1454 |

FOREIGN PATENT DOCUMENTS

| | | |
|---|---|---|
| KR | 20220158824 | 12/2022 |
| WO | 2016168591 | 10/2016 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |
| WO | 2024228914 | 11/2024 |

OTHER PUBLICATIONS

"International Application Serial No. PCT/US2024/026412, Written Opinion mailed Aug. 30, 2024", 6 pgs.

* cited by examiner

AUGMENTED REALITY MOOD BOARD MANIPULATION

TECHNICAL FIELD

The present disclosure relates to extended reality (XR) devices, such as augmented reality (AR) and/or virtual reality (VR) devices.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." Collectively, AR and VR as known as "XR" where "X" is understood to stand for either "augmented" or "virtual." As used herein, the term XR refers to either or both augmented reality and virtual reality as traditionally understood, unless the context indicates otherwise.

A user of the head-worn device may access and use a computer software application to perform various tasks or engage in an entertaining activity. To use the computer software application, the user interacts with a 3D user interface provided by the head-worn device.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
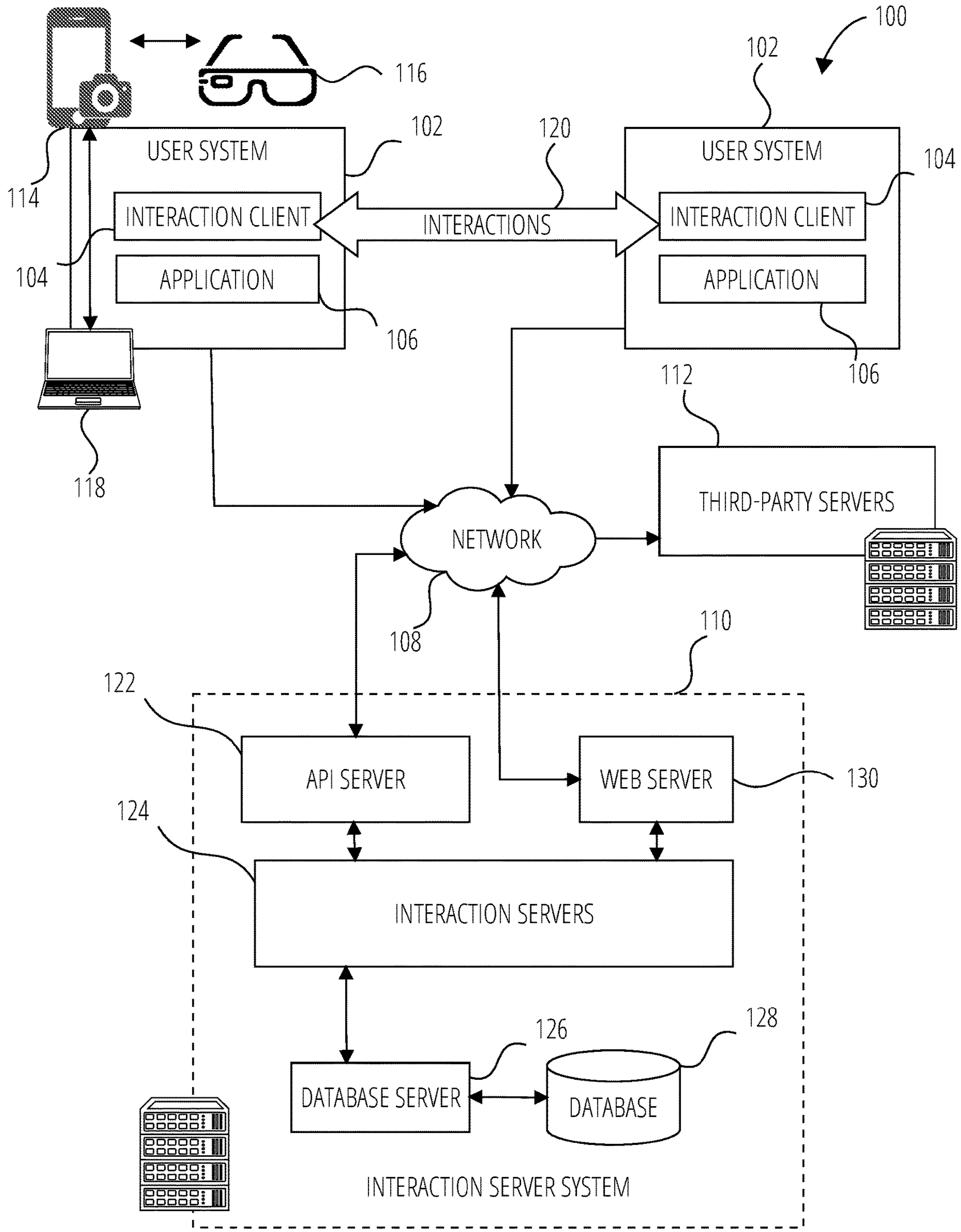
FIG. 1 is a diagrammatic representation of a networked environment in which the present disclosure may be deployed, according to some examples.

A mood board is a physical media gallery comprising a collage of images, text, and samples of objects in a visual composition, normally placed on a wall. A mood board can reflect a particular topic, or can be any material chosen at random based on the creator's preference. Mood boards can reflect a general idea or feeling about a particular topic, location, goals, aspirations, brainstorming and so forth.

Disclosed herein is an augmented reality (AR) mood board that can be created by selecting media items on a smartphone or other portable device, and swiping them into a field of view of a corresponding augmented reality device, such as head-worn AR glasses. The AR mood board is pinned to a particular location and provides an amphitheater-like layout for receiving the selected media items. Movement of the media item from the portable device is animated as a thumbnail representation of the media item leaving the top of the smartphone, and moving through the air into position in the AR media board.

A number of mood boards can be associated with a particular user for providing different media collections in different physical locations. For example, a mood board including workout or yoga or sporting photos or nature scenes may be placed by the user at or near an exercise location or yoga mat, to provide motivation or tranquility, while another mood board with creative sketches or relational diagrams may be placed at a home office or work office location.

Each mood board is associated with an AR anchor that defines the physical location in the real world at which that mood board appears to be located when the user is wearing the AR glasses. The items in the mood board have a defined positional relationship to the anchor. The anchor also has an orientation in the real world associated therewith. The items in the mood board also have a fixed angular relationship to the anchor. The orientation of the anchor thus defines one or more rotational positions of the mood board as it appears in the real world.

The AR anchor is visible to the user when the mood board is being viewed, or becomes visible based on an associated context such as the mood board being in the field of view of the AR glasses and the detection by the glasses of a user's hand in the field of view of the AR glasses. The AR anchor can be grasped in the field of view of the glasses by the user's hand, and the anchor (and thus the mood board) can be dragged to a new physical location, or the position fine-tuned. The anchor may also display rotational adjustment user interfaces that can be used to rotate the mood board about a vertical axis. In some examples, the mood board can also be rotated around one or two horizontal axes, but the number of axes or the amount of movement may be constrained. For example, rotation of the mood board about a horizontal axis parallel to the displays of the AR glasses may be permitted to a limited degree to tilt the mood board up or down, while rotation of the mood board about a horizontal axis perpendicular to the displays of the AR glasses may not be permitted, to prevent the mood board being tilted left or right.

Some head-worn XR devices, such as AR glasses, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality (AR) experience for the user. The display may for example include a waveguide that receives a light beam from a projector but any appropriate display for presenting augmented or virtual content to the wearer may be used.

As referred to herein, the phrase "augmented reality experience," includes or refers to various image processing operations corresponding to an image modification, filter, media overlay, transformation, and the like, as described further herein. In some examples, these image processing operations provide an interactive experience of a real-world environment, where objects, surfaces, backgrounds, lighting and so forth in the real world are enhanced by computer-generated perceptual information. In this context an "augmented reality effect" comprises the collection of data, parameters, and other assets used to apply a selected augmented reality experience to an image or a video feed. In some examples, augmented reality effects are provided by Snap, Inc. under the registered trademark LENSES.

In some examples, a user's interaction with software applications executing on an XR device is achieved using a 3D User Interface. The 3D user interface includes virtual objects displayed to a user by the XR device in a 3D render displayed to the user. In the case of AR, the user perceives the virtual objects as objects within the real world as viewed by the user while wearing the XR device. In the case of VR, the user perceives the virtual objects as objects within the virtual world as viewed by the user while wearing the XR device To allow the user to interact with the virtual objects, the XR device detects the user's hand positions and movements and uses those hand positions and movements to determine the user's intentions in manipulating the virtual objects.

Generation of the 3D user interface and detection of the user's interactions with the virtual objects may also include detection of real-world objects (e.g., faces, hands, bodies, cats, dogs, surfaces, objects), tracking of such real-world objects as they leave, enter, and move around the field of view in video frames, and the modification or transformation of such real-world objects as they are tracked. In various examples, different methods for detecting the real-world objects and achieving such transformations may be used. For example, some examples may involve generating a 3D mesh model of a real-world object or real-world objects, and using transformations and animated textures of the model within the video frames to achieve the transformation. In other examples, tracking of points on a real-world object may be used to place an image or texture, which may be two dimensional or three dimensional, at the tracked position. In still further examples, neural network analysis of video frames may be used to place images, models, or textures in content (e.g., images or frames of video). XR effect data thus may include both the images, models, and textures used to create transformations in content, as well as additional modeling and analysis information used to achieve such transformations with real-world object detection, tracking, and placement.

Other technical features may be readily apparent to one skilled in the art from the following figures, descriptions, and claims.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple Applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-worn device 116, and a computer 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, user device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph; the location of friends within an entity relationship graph; and opening an Application event (e.g., relating to the interaction client 104).

The interaction servers 124 host multiple systems and subsystems, described below with reference to FIG. 4.

Figure 2:
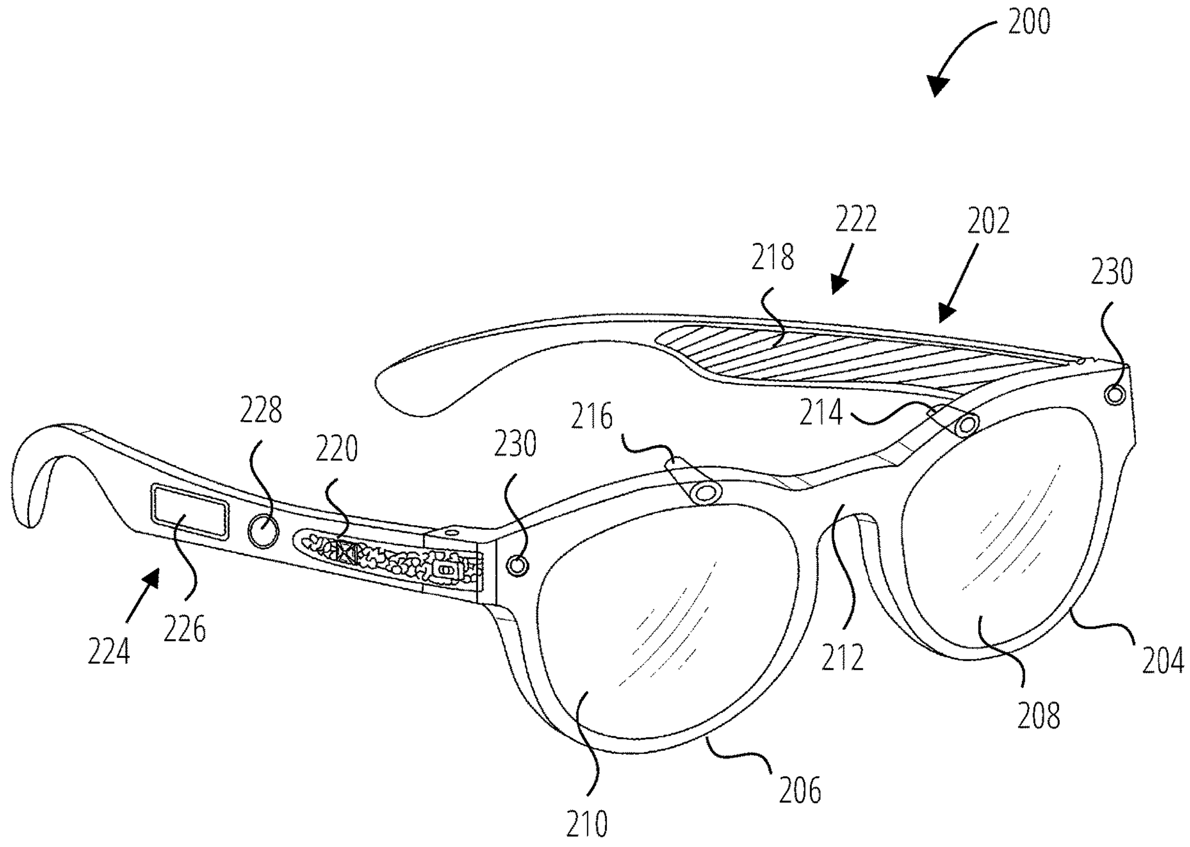
FIG. 2 is a perspective view of a head-worn device, according to some examples.

FIG. 2 is perspective view of a head-worn XR device (e.g., glasses 200), in accordance with some examples. The glasses 200 can include a frame 202 made from any suitable material such as plastic or metal, including any suitable shape memory alloy. In one or more examples, the frame 202 includes a first or left optical element holder 204 (e.g., a display or lens holder) and a second or right optical element holder 206 connected by a bridge 212. A first or left optical element 208 and a second or right optical element 210 can be provided within respective left optical element holder 204 and right optical element holder 206. The right optical element 210 and the left optical element 208 can be a lens, a display, a display assembly, or a combination of the foregoing. Any suitable display assembly can be provided in the glasses 200.

The frame 202 additionally includes a left arm or temple piece 222 and a right arm or temple piece 224. In some examples the frame 202 can be formed from a single piece of material so as to have a unitary or integral construction.

The glasses 200 can include a computing device, such as a computer 220, which can be of any suitable type so as to be carried by the frame 202 and, in one or more examples, of a suitable size and shape, so as to be partially disposed in one of the temple piece 222 or the temple piece 224. The computer 220 can include one or more processors with memory, wireless communication circuitry, and a power source. As discussed below, the computer 220 comprises low-power circuitry, high-speed circuitry, and a display processor. Various other examples may include these elements in different configurations or integrated together in different ways. Additional details of aspects of computer 220 may be implemented as discussed below with reference to FIG. 12 and FIG. 13.

The computer 220 additionally includes a battery 218 or other suitable portable power supply. In some examples, the battery 218 is disposed in left temple piece 222 and is electrically coupled to the computer 220 disposed in the right temple piece 224. The glasses 200 can include a connector or port (not shown) suitable for charging the battery 218, a wireless receiver, transmitter or transceiver (not shown), or a combination of such devices.

The glasses 200 include a first or left camera 214 and a second or right camera 216. Although two cameras are depicted, other examples contemplate the use of a single or additional (i.e., more than two) cameras. In one or more examples, the glasses 200 include any number of input sensors or other input/output devices in addition to the left camera 214 and the right camera 216. Such sensors or input/output devices can additionally include biometric sensors, location sensors, motion sensors, and so forth.

In some examples, the left camera 214 and the right camera 216 provide video frame data for use by the glasses 200 to extract 3D information from a real world scene.

The glasses 200 may also include a touchpad 226 mounted to or integrated with one or both of the left temple piece 222 and right temple piece 224. The touchpad 226 is generally vertically-arranged, approximately parallel to a user's temple in some examples. As used herein, generally vertically aligned means that the touchpad is more vertical than horizontal, although potentially more vertical than that. Additional user input may be provided by one or more buttons 228, which in the illustrated examples are provided on the outer upper edges of the left optical element holder 204 and right optical element holder 206. The one or more touchpads 226 and buttons 228 provide a means whereby the glasses 200 can receive input from a user of the glasses 200.

The glasses may also include one or more microphones 230 for capturing audio such as the wearer's speech for communication or voice commands, or for capturing ambient audio for recording with or without video capture.

Figure 3:
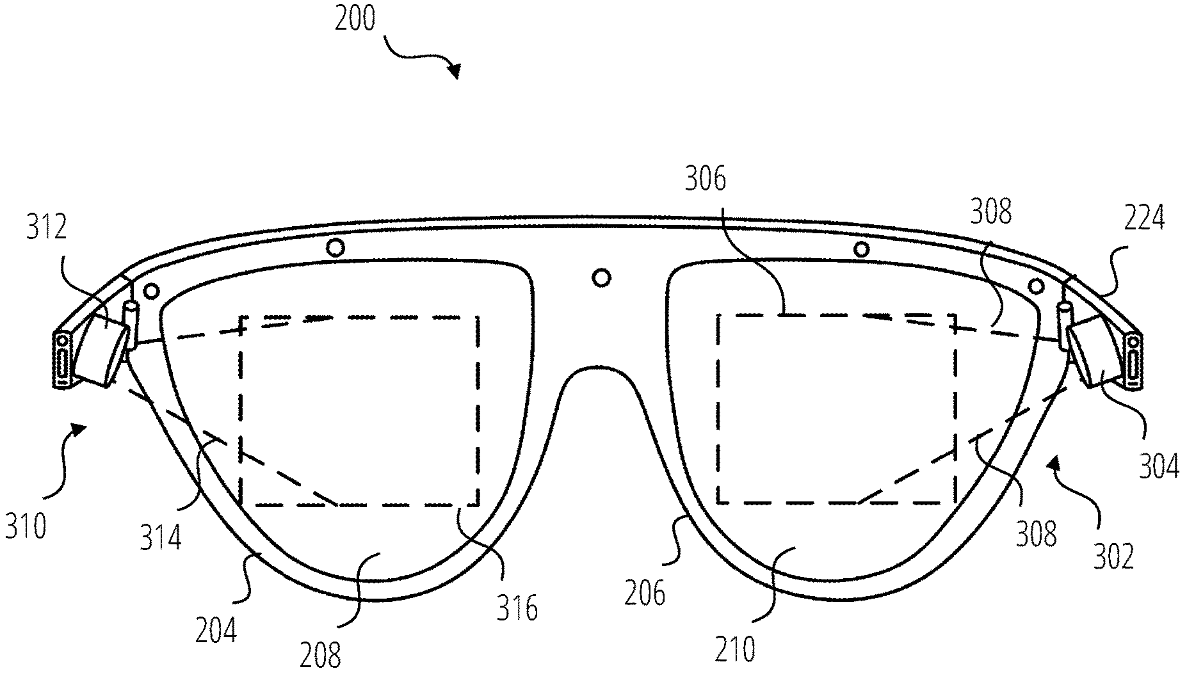
FIG. 3 illustrates a further view of the head-worn device of FIG. 2, according to some examples.

FIG. 3 illustrates the glasses 200 from the perspective of a user. For clarity, a number of the elements shown in FIG. 2 have been omitted. As described in FIG. 2, the glasses 200 shown in FIG. 3 include left optical element 208 and right optical element 210 secured within the left optical element holder 204 and the right optical element holder 206 respectively.

The glasses 200 include forward optical assembly 302 comprising a right projector 304 and a right near eye display 306, and a forward optical assembly 310 including a left projector 312 and a left near eye display 316.

In some examples, the near eye displays are waveguides. The waveguides include reflective or diffractive structures (e.g., gratings and/or optical elements such as mirrors, lenses, or prisms). Light 308 emitted by the projector 304 encounters the diffractive structures of the waveguide of the near eye display 306, which directs the light towards the right eye of a user to provide an image on or in the right optical element 210 that overlays the view of the real world seen by the user. Similarly, light 314 emitted by the projector 312 encounters the diffractive structures of the waveguide of the near eye display 316, which directs the light towards the left eye of a user to provide an image on or in the left optical element 208 that overlays the view of the real world seen by the user. The combination of a GPU, the forward optical assembly 302, the left optical element 208, and the right optical element 210 provide an optical engine of the glasses 200. The glasses 200 use the optical engine to generate an overlay of the real-world view of the user including a display of a 3D user interface to the user of the glasses 200.

It will be appreciated however that other display technologies or configurations may be utilized within an optical engine to display an image to a user in the user's field of view. For example, instead of a projector 304 and a waveguide, an LCD, LED or other display panel or surface may be provided.

In use, a user of the glasses 200 will be presented with information, content and various 3D user interfaces on the near eye displays. As described in more detail herein, the user can then interact with the glasses 200 using a touchpad 226 and/or the buttons 228, voice inputs or touch inputs on an associated device (e.g. mobile device 114 illustrated in FIG. 1), and/or hand movements, locations, and positions detected by the glasses 200.

System Architecture

Figure 4:
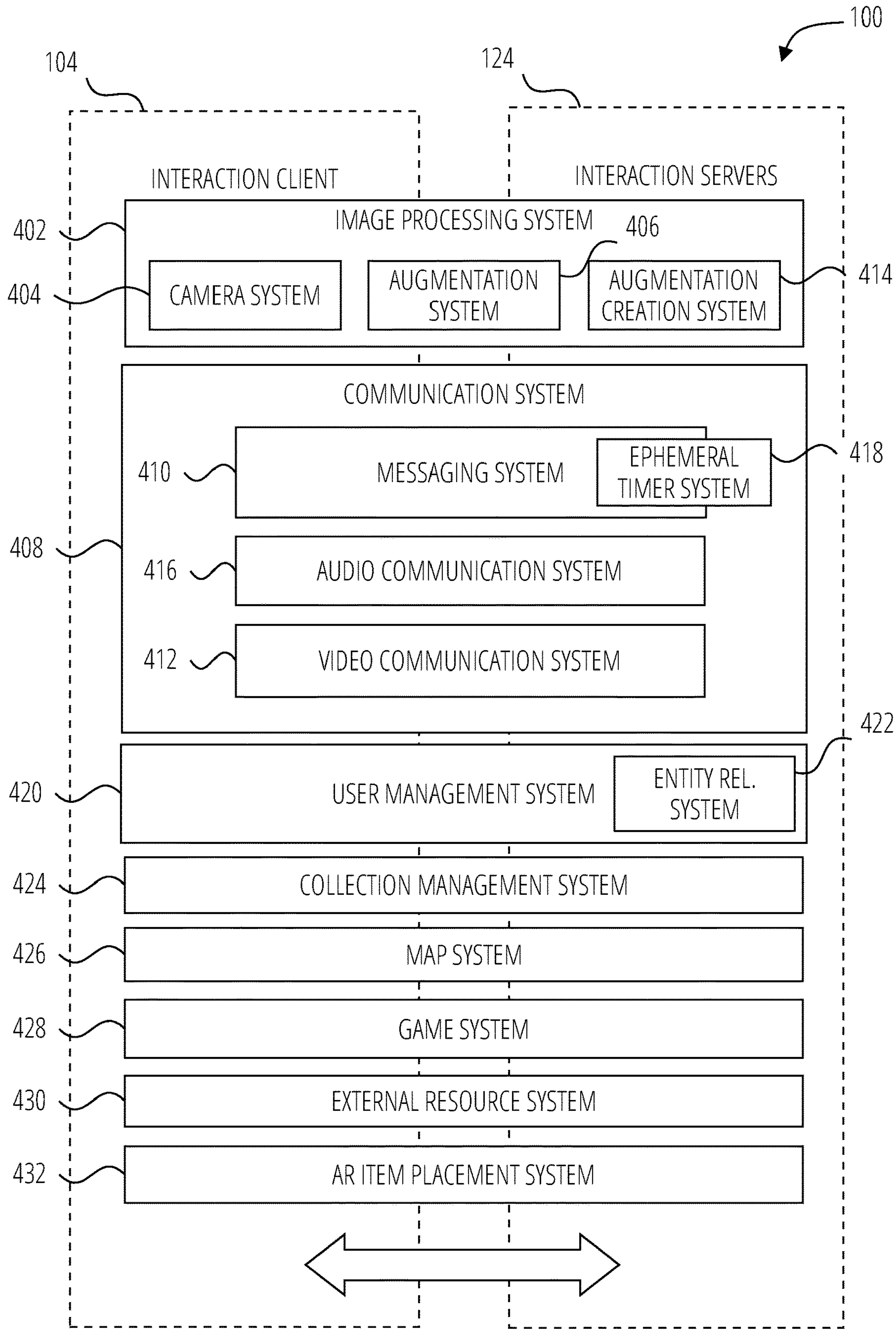
FIG. 4 is a diagrammatic representation of a messaging system, according to some examples, that has both client-side and server-side functionality.

FIG. 4 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 402 provides various functions that enable a user to capture and augment (e.g., annotate or otherwise modify or edit) media content associated with a message.

A camera system 404 includes control software (e.g., in a camera Application) that interacts with and controls hardware camera hardware (e.g., directly or via operating system controls) of the user system 102 to modify and augment real-time images captured and displayed via the interaction client 104.

The augmentation system 406 provides functions related to the generation and publishing of augmentations (e.g., media overlays) for images captured in real-time by cameras of the user system 102 or retrieved from memory of the user system 102. For example, the augmentation system 406 operatively selects, presents, and displays media overlays (e.g., an image filter or an image lens) to the interaction client 104 for the augmentation of real-time images received via the camera system 404 or stored images retrieved from memory 1202 of a user system 102. These augmentations are selected by the augmentation system 406 and presented to a user of an interaction client 104, based on a number of inputs and data, such as for example geolocation of the user system 102 and entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 402 may interact with, and support, the various subsystems of the communication system 408, such as the messaging system 410 and the video communication system 412.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 402 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 402 provides a user-based publication platform that enables users to select a geolocation on a map and upload content associated with the selected geolocation. The user may also specify circumstances under which a particular media overlay should be offered to other users. The image processing system 402 generates a media overlay that includes the uploaded content and associates the uploaded content with the selected geolocation.

The augmentation creation system 414 supports augmented reality developer platforms and includes an Application for content creators (e.g., artists and developers) to create and publish augmentations (e.g., augmented reality experiences) of the interaction client 104. The augmentation creation system 414 provides a library of built-in features and tools to content creators including, for example custom shaders, tracking technology, and templates.

In some examples, the augmentation creation system 414 provides a merchant-based publication platform that enables merchants to select a particular augmentation associated with a geolocation via a bidding process. For example, the augmentation creation system 414 associates a media overlay of the highest bidding merchant with a corresponding geolocation for a predefined amount of time.

A communication system 408 is responsible for enabling and processing multiple forms of communication and interaction within the interaction system 100 and includes a messaging system 410, an audio communication system 416, and a video communication system 412. The messaging system 410 is responsible for enforcing the temporary or time-limited access to content by the interaction clients 104. The messaging system 410 incorporates multiple timers (e.g., within an ephemeral timer system 418) that, based on duration and display parameters associated with a message or collection of messages (e.g., a story), selectively enable access (e.g., for presentation and display) to messages and associated content via the interaction client 104. Further details regarding the operation of the ephemeral timer system 418 are provided below. The audio communication system 416 enables and supports audio communications (e.g., real-time audio chat) between multiple interaction clients 104. Similarly, the video communication system 412 enables and supports video communications (e.g., real-time video chat) between multiple interaction clients 104.

A user management system 420 is operationally responsible for the management of user data and profiles, and includes an entity relationship system 422 that maintains information regarding relationships between users of the interaction system 100.

A collection management system 424 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 424 may also be responsible for publishing an icon that provides notification of a particular collection to the user interface of the interaction client 104. The collection management system 424 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 424 employs machine vision (or image recognition technology) and content rules to curate a content collection automatically. In certain examples, compensation may be paid to a user to include user-generated content into a collection. In such cases, the collection management system 424 operates to automatically make payments to such users to use their content.

A map system 426 provides various geographic location functions and supports the presentation of map-based media content and messages by the interaction client 104. For example, the map system 426 enables the display of user icons or avatars (e.g., stored in user profile data) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 428 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 430 provides an interface for the interaction client 104 to communicate with remote servers (e.g., third-party servers 112) to launch or access external resources, i.e., Applications or applets. Each third-party server 112 hosts, for example, a markup language (e.g., HTML5) based Application or a small-scale version of an Application (e.g., game, utility, payment, or ride-sharing Application). The interaction client 104 may launch a web-based resource (e.g., Application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based Application. The interaction servers 124 host a JavaScript library that provides a given external resource access to specific user data of the interaction client 104. HTML5 is an example of technology for programming games, but Applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the Application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale Applications (e.g., an application 106) are provided with access to a first type of user data (e.g., two-dimensional avatars of users with or without different avatar characteristics). As another example, external resources that include small-scale versions of Applications (e.g., web-based versions of Applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An AR item placement system 432 receives an image or video from a user system 102 that depicts a real-world environment (e.g., a room in a home), as well as data from the position components 1334 and the motion components 1330. The AR item placement system 432 detects one or more real-world objects or features depicted in the image or video and uses the detected one or more real-world objects to characterize the real-world environment, for example by generating a 3D mesh model of the environment. The AR item placement system 432 may also compute a classification for the real-world environment. For example, the AR item placement system 432 can classify the real-world environment as a kitchen, a bedroom, a nursery, a toddler room, a teenager room, an office, a living room, a den, a formal living room, a patio, a deck, a balcony, a bathroom, or any other suitable home-based room classification. Once classified, the AR item placement system AR item placement system 432 identifies one or more items (such as physical products or electronically consumable content items) related to the real-world environment classification.

The AR item placement system 432 also positions and displays an AR mood board comprising a number of media items. The AR item placement system 432 obtains placement and orientation parameters for the AR items that form part of the mood board described in more detail below.

The AR item placement system 432 can determine a current placement and orientation for display of the mood board and of items within the mood board based on the pose of the glasses and user inputs such as gestures performed using the user's hands or with an associated mobile device 114 within the video feed. The placement of the mood board itself is defined by an anchor, which can be moved by the user as described in more detail below. The position of media items within the mood board is specified by an existing layout relative to the anchor. In some examples, the layout is an amphitheater type-layout, in which media items in the mood board are arranged in curved rows increasing in height with distance from the viewpoint of the wearer of the glasses 200. The AR item placement system 432 places an AR item (such as a media item in the mood board) in the field of view of the glasses 200, maintains the position of the AR item based on movement of the glasses, and updates the size, orientation or location of the AR item based on user input.

The AR item placement system 432 is a component that can be accessed by an AR/VR application implemented on the user system 102. The AR/VR application uses an RGB camera to capture an image of a room in a home. The AR/VR application applies various trained machine learning techniques on the captured image or video of the real-world environment to classify the real-world environment. In most implementations, the AR/VR Application continuously captures images of the real-world environment in real time or periodically to continuously or periodically update the relative positions and orientations of the AR items. This allows the user to move around in the real world and see updated AR representations of items available for purchase in the current real-world environment depicted in an image or video in real time.

The video or images received from the cameras may include representations of one or both of the user's hands, as the user makes movements with their hands within the field of view of the cameras. A gesture intent recognition engine included in the AR item placement system 432 recognizes the hand(s), determines the position and orientation of each hand, as well as any gesture being performed by the hand, to generate hand gesture data. The hand gesture data is used to as an input to a user interface, which may include determining the proximity of the hand to AR items that may include media in the mood board, virtual user interface elements generally, or those associated with the mood board itself or with media items in the mood board.

In some examples, a user wears one or more sensor gloves on the user's hands that generate sensed hand position data and sensed hand location data. The sensed hand position data and sensed hand location data are communicated to the gesture intent recognition engine in lieu of or in combination with representations of the hand(s) in the video feed, to provide hand gesture data.

Figure 5:
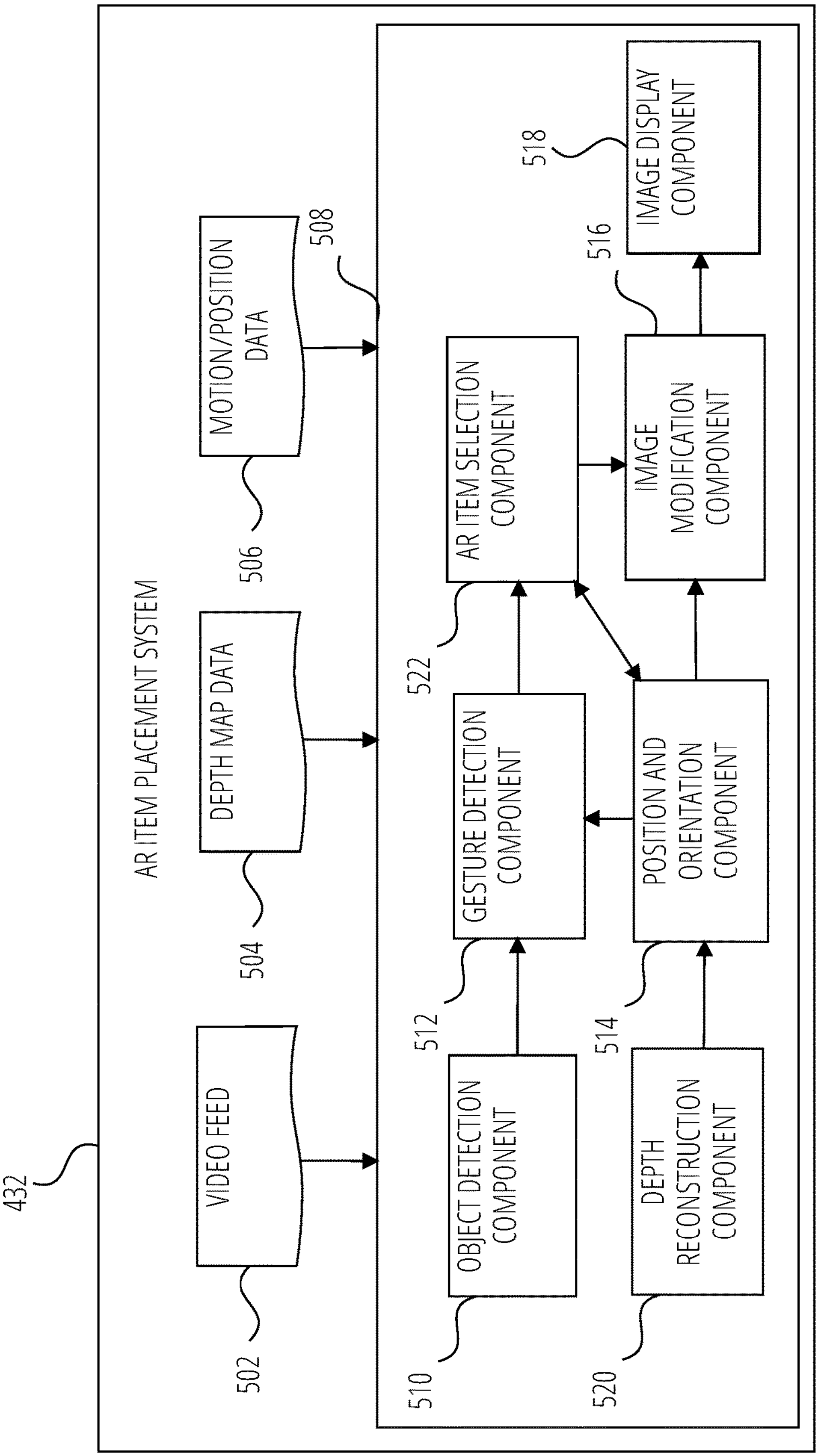
FIG. 5 is a block diagram showing an example AR item placement system, according to some examples.

FIG. 5 is a block diagram showing an example AR item placement system 432 according to example examples. The AR item placement system 432 includes a set of components 508 that operate on a set of input data (e.g., a video feed 502 depicting a real-world environment, depth map data 504 (obtained from a depth sensor or camera of a user system 102) and motion/position data 506 (received from motion components 1330 and position components 1334). The AR item placement system 432 includes an object detection component 510, a gesture detection component 512, a depth reconstruction component 520 (which can be used to generate a 3D model of the real-world environment), a position and orientation component 514, an image modification component 516, an AR item selection component 522, and an image display component 518. All or some of the components of the AR item placement system 432 can be implemented by a server, in which case, the monocular image depicting a real-world environment and the depth map data 504 are provided to the server by the user system 102. In some examples, the AR item placement system 432 is implemented by the head-worn device 116, but some or all of the components of the AR item placement system 432 can be implemented by other components of the user system 102 or can be distributed across a set of client systems 102.

The object detection component 510 receives a video feed 502 including a depiction of a real-world environment. This can be received as part of a real-time video stream, a previously captured video stream or a new image captured by a camera of the user system 102. The object detection component 510 applies one or more machine learning techniques to identify real-world physical objects that appear in the monocular image depicting a real-world environment. For example, the object detection component 510 can segment out individual objects in the image and assign a label or name to the individual objects. Specifically, the object detection component 510 can recognize a sofa as an individual object, a television as another individual object, a light fixture as another individual object, the mobile device 114 as an individual object, and so forth. Additionally, the object detection component 510 identifies any of the user's hands in the video feed 502.

The object detection component 510 provides the identified and recognized objects and their locations in the video feed to the gesture detection component 512. The gesture detection component 512 determines whether or not any detected hands in the video feed are performing a gesture, which may be a particular movement (such as a swipe) or shape (such as a pinch) or a combination of the two performed by one or both of the user's hands. The gesture detection component 512 can also receive data via short-range data transmissions, on gestures or other inputs performed on the mobile device 114, such as a swipe or pinch or tap on a touch screen, or a movement performed with the mobile device 114. The gesture detection component 512 provides the identification of any detected gesture, and its location, as well as the identified and recognized real-world objects and their locations in the video feed to the AR item selection component 522.

The depth reconstruction component 520 receives depth map data 504 from a depth sensor, a LiDAR sensor, or depth camera of the user system 102. The depth reconstruction component 520 can generate a three-dimensional (3D) model (mesh) representation or reconstruction of the real-world environment depicted in the image or video captured by the user system 102. The depth reconstruction component 520 can provide the 3D model representation or reconstruction of the room to the position and orientation component 514.

The position and orientation component 514 determines and keep track of the position and orientation (the "pose") of the head-worn device 116 relative to a frame of reference or relative to another object, based on the data received from the depth reconstruction component 520 and the motion/position data 506, using techniques such as structure from motion (SfM) and or visual-inertial odometry (VIO). The position and orientation component 514 can also determine a relative pose between the head-worn device 116 and the mobile device 114 either by receiving updates on the pose of the mobile device 114 transmitted by short-range data transmissions using protocols such as Bluetooth, or by recognizing the position and orientation of the mobile device 114 in the video feed, or some combination of the two.

The position and orientation component 514 also determines and keeps track of one or more position and orientation parameters associated with AR representations. The one or more position and orientation parameters are used to place the AR representations within the real-world environment depicted in the image or video. In some cases, the position and orientation parameters include a prioritized list of possible position and orientations for the AR representations, such as the media items in the mood board.

For example, the position and orientation parameters can specify a set of positions for AR items, such as an amphitheater arrangement for media items, or a particular location for a single AR item. In cases in which a collection of AR items is portrayed, the collection itself may have an anchor location that defines an overall position of the collection in a real-world frame of reference. The anchor location for a collection, the arrangement of items within the collection, and the positions of individual items can be defined with respect to real-world objects such as walls, doors, refrigerators, desks and so forth. The position and orientation parameters can specify a floor real-world object as a lower ranked position and orientation for the AR representation. The position and orientation component 514 can control which position and orientation is recommended for the AR representation based on determining whether each position and orientation is available or unavailable starting with the top ranked position and orientation.

The position and orientation component 514 can generate a segmentation of the 3D model to identify borders of the 3D model of the real-world object. The position and orientation component 514 can generate a representation that includes an outline of the borders of the 3D model. The position and orientation parameters can then determine an available free space (e.g., area free of (area that fails to include real-world objects, such as televisions, refrigerators, couches, walls, ceilings and floors) using the borders of the 3D model of the real-world environment received from the depth reconstruction component 520 or determined directly by the position and orientation component 514. The available free space can be compared with a default or selected minimum space (size and shape) required for a collection of AR items. Based on the comparison, a boundary can be set beyond which an anchor location for the collection cannot be placed, or the size of the arrangement and the objects therein can be scaled, or the number of available spaces in the collection can be reduced to fit the available space.

The position and orientation component 514 communicates the 3D model of the real-world environment, the position and orientation data for each AR item, and the space that has been determined to be available for the AR items, to the gesture detection component 512, the AR item selection component 522, and image modification component 516.

The AR item selection component 522 maintains a list of AR items, as well as their attributes and positions and orientations in one or more frames of reference. The information maintained by the AR item selection component 522 defines what is presented in the near eye displays 306, 316 of the glasses 200 as an overlay on top of the real-world environment depicted in the image or video captured by the camera of the user system 102. The AR item selection component 522 receives the identification of any detected gesture, and its location, as well as the identified and recognized real-world objects and their locations in the video feed from the gesture detection component 512.

The AR item selection component 522 compares any detected gesture and its location with the locations of any real-world objects and the locations of any AR items, and based on the proximity of a gesture or a real or virtual object, and a table of permitted interactions for real or virtual objects, updates the information maintained by the AR item selection component 522 relating to the presence, absence, position and orientation, and permitted interactions, for the AR items maintained by the AR item selection component 522. Additionally, the AR item selection component 522 may update the AR items and their context based on information received from the position and orientation component 514, such as the position and orientation of the mobile device 114.

For example, detection of the proximity of a hand (an identified real-world object) near a particular AR item (such as a media item in a mood board) by the AR item selection component 522 may cause the display of user-interface options at or near the AR item. Subsequent detection of an appropriate gesture near a particular user-interface option, will cause the AR item selection component 522 to update the information relating to the AR item based on the gesture, as well as triggering any related operations to be performed by the glasses. For example, selection of a trash can icon near an AR item will cause the AR item to be removed from the set of AR items tracked and maintained by the AR item selection component 522, and any related records associated with the user, for example elsewhere in the interaction system 100 such as in a related database 128, to be updated. Any updates to the current group of AR items is provided to either or both of the position and orientation component 514 and the image modification component 516

The image modification component 516 instructs the image display component 518 to display the AR items overlaying the real-world environment to the user, on the glasses 200. In the case in which a video feed from one of the cameras is provided in the display (for example in the case of AR effects being displayed on the mobile device 114 or on a VR display device), the image modification component 516 instructs the image display component 518 to display the AR items overlaying the video feed of the real-world environment. The image modification component 516 also provides updated display instructions for any existing AR items that are being displayed, based on movement of the AR glasses 200 relative to the real world or based on any user inputs that move, modify or dismiss any AR items.

More specifically, the image modification component 516 receives the 3D model of the real-world environment, the position and orientation data for each AR item, and the space that has been determined to be available for the AR items, from the position and orientation component 514. Any changes or modifications to the AR items based on operation of the AR item selection component 522 are either reflected in the data received from the image modification component 516, which may receive this data from the image modification component 516, or the modifications are performed by the image modification component 516 based on data received directly from the AR item selection component 522.

The image modification component 516 determines, based on the information received from the position and orientation component 514 and AR item selection component 522, the field of view of the glasses 200 in the real-world environment, which AR items are within the field of view of the glasses 200 and thus need to be rendered by the glasses 200, and the position and orientation of the AR items in the frame of reference of the glasses 200. For AR items with locations that are fixed in real-world positions, this will involve a transformation of the frame of reference of the AR items from a real-world coordinate system to a coordinate system fixed to the glasses 200. The image modification component 516 then determines a 2D projection of the AR items for each of the near eye displays 306, 316. The 2D projections are then provided to the image display component 518, which renders them on the near eye displays 306, 316.

Figure 6:
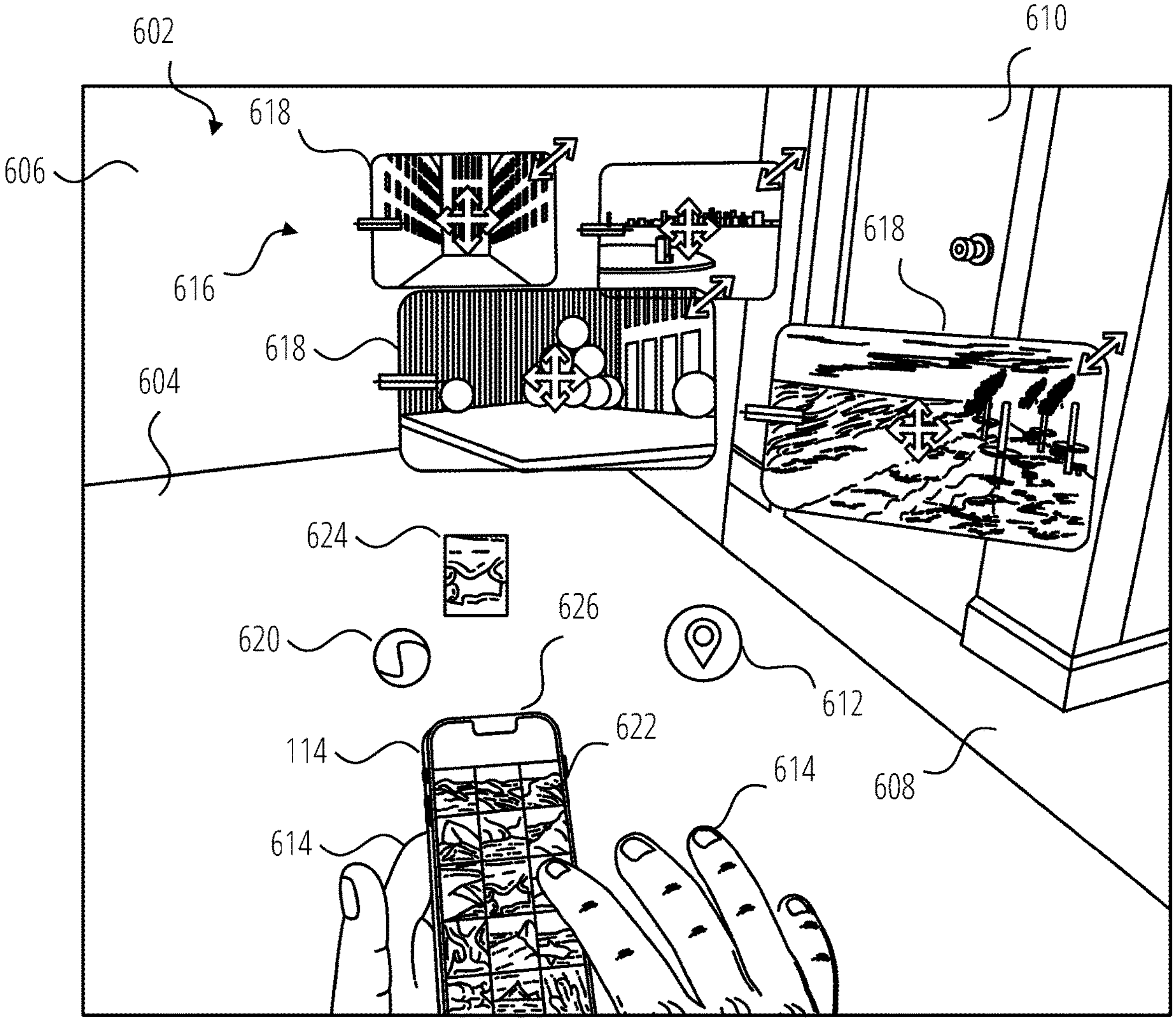
FIG. 6 is a depiction of a real-world environment from the perspective of the user of the head-worn device, including a mood board, according to some examples.

FIG. 6 is a depiction of a real-world environment 602 from the perspective of the user of a head-worn device, such as the glasses 200, including a mood board 616, according to some examples. As can be seen, the real-world environment 602 includes a table 604, a wall 606, a floor 608 and a closet 610 as seen through the left optical element 208 and right optical element 210. Displayed on the near eye displays 306 are AR items and effects, including a number of media items 618 making up the mood board 616. The location, orientation of the mood board 616 and its contents are as defined and updated as specified by the AR item placement system 432 as described with reference to FIG. 5.

The location of the mood board 616 itself is defined with respect to an anchor icon 612, and the position of the media items within the mood board 616 is defined relative to the anchor icon 612 by a layout of the mood board. One example of a layout is the layout 700 illustrated in FIG. 7. The location of the entire mood board 616 can be changed by selecting the anchor icon 612 (for example by a pinch gesture) and dragging the anchor icon 612 (and thus the mood board 616) to a new location in the real world.

Also shown in FIG. 6 is a mobile device 114 and user user's hands 614. Shown on the display of the mobile device 114 is a "camera roll" consisting of the photos and videos captured or stored by the user on the mobile device 114. The user can send a media item to the mood board 616 by selecting the media item in the from the camera roll, for example by pressing and holding on the display over a particular media item, and then sending the particular media item to the mood board by swiping on the display screen towards the top of the mobile device 114.

As this occurs, the media item will follow the user's fingertip on the display of the mobile device 114 towards its top edge 626, where it will appear to leave the display and will appear as a virtual media item 624, moving from the top of the display towards and into an available position in the mood board 616. As the virtual media item 624 moves from the mobile device 114 into place in the mood board 616, it will increase in size to its final size in the mood board 616, and its orientation will transition from parallel to the display of the mobile device 114 into a vertical orientation in the mood board 616.

The position of media items 618 in the mood board 616 can depend on various factors. In some examples, a default order is set for the placement of new items in the media board, such as starting with the lowest central point in the mood board and expanding laterally initially and then vertically as the lower rows become partially or completely filled. In another example, the direction in which the glasses 200 are pointing in a real-world frame of reference will identify at least a horizontal position for placement of the next media item, and possibly also a vertical position for the next media item. In further examples, the pose of the mobile device 114 in a real-world frame of reference will identify at least a horizontal position for placement of the next media item, and possibly also a vertical position for the next media item.

When the position of the next media item is specified or suggested by the orientation of the glasses 200 or the mobile device 114, additional AR visual cues may be provided to assist the wearer of the glasses 200 in identifying and choosing a location in the media board for the next item. For example, an AR beam could be rendered by the AR item placement system 432 to appear as if it is shooting out of the top of the mobile device 114 like a laser pointer, giving a clear indication to the wearer of the glasses 200 as to where the mobile device 114 is being pointed.

Alternatively or additionally, a vacant location identified by the direction of the glasses 200 or the mobile device 114 can be shown by displaying an AR item or effect, such as a highlighted rectangular frame or translucent rectangle, when a media item is selected but before it is swiped out of the mobile device 114. A particular location can then be selected by moving the glasses 200 or the mobile device 114 to highlight or otherwise identify vacant spaces in the media board.

Also shown in FIG. 6 is an autolayout button 620. The autolayout button 620 persists in the field of view of the glasses 200 when mood board functionality is enabled, so that it is always available for selection. Selection of the autolayout button 620 toggles between a mode in which a media item 624 being transferred from the mobile device 114 to the glasses 200 automatically goes to the next predefined (and possibly identified) position in the mood board 616 as described above, and a mode in which a media item 624 being transferred into the mood board hangs in the air in front of the mood board 616 with the user interface elements described in FIG. 8 visible, so that the position and orientation of the media item 624 can be specified in response to the receipt of user input dragging, rotating or resizing the media item 624 into a desired position and orientation in the mood board 616.

In most cases, the media selected by the user for swiping into the media mood board 616 is stored on the mobile device 114, generally duplicated in the network 108 on one of the database servers 126. Each media item may be a number of megabytes in size, which poses a challenge for providing a seamless experience for the user, since the media items 618 and transitional media items such as media item 624 are rendered by the glasses 200, which do not initially have a copy of each media item.

To address this challenge, a lower-resolution "thumbnail" representation of the selected media item is transmitted directly from the mobile device 114 to the glasses 200 via a short-range data transmission, using for example a protocol like Bluetooth LE. Included with the thumbnail is a link that can be used by the glasses 200 to download a higher-resolution or full resolution representation of the selected media item. The initial animation of the movement of the media item 624 from the mobile device 114 into position in the mood board 616 is thus rendered by the glasses 200 using the thumbnail, while the glasses 200 request and retrieve the higher or full resolution representation of the media item 624 from a database server 126 in the interaction system 100.

Alternatively, the full or higher-resolution representation of the selected media item is transmitted directly from the mobile device 114 to the glasses 200 via a short-range data transmission, using for example a protocol like Bluetooth LE, at the same time or immediately after transmission of the thumbnail representation, and, as before, the initial animation of the movement of the media item 624 from the mobile device 114 into position in the mood board 616 is rendered by the glasses 200 using the thumbnail representation, while the higher or full resolution representation of the media item 624 is being transmitted to the glasses 200 from the mobile device 114 using the short-range data transmission.

The short-range data transmission is typically between 0 and 3 ft., being the distance between the glasses 200 when worn and the mobile device 114 when held, but a local data transmission between the two devices when in the general vicinity, for example up to between 30 ft. and 100 ft., is also comprehended as a short-range data transmission. Any data transmission protocol capable of achieving these ranges is suitable, irrespective of whether the protocol has a substantially larger maximum range.

When the higher or full resolution representation is received, it is then displayed by the glasses 200 in place of the thumbnail representation. Preferably the full or high resolution representation is received by the glasses when or before the media item 624 arrives at its location in the media board, so that the media item 624 is immediately displayed in higher-resolution upon its arrival, but if not, the thumbnail representation can be displayed in the media board until such time as the full or higher-resolution representation of the media item 624 is received by the glasses 200.

As used herein, low-resolution, lower-resolution, or thumbnail representation is used as a relative term to compare the resolution of the initially-transmitted representation of the media item to the resolution of the final representation of the media item that is subsequently received and displayed in the mood board 616. Similarly, high, higher, or full resolution is used as a relative term to compare the resolution of the final representation of the media item displayed in the mood board 616 with the initially-transmitted representation of the media item. Being comparative, these terms do not imply any particular level of resolution as such.

Furthermore, a representation of the media item may in fact be the media item itself, or more correctly an exact copy of the media item itself, in the case of a full-size version that is displayed in the mood board 616. In the case of a video media item, the representation of the media item may be a frame from the video, or a movie poster, or other identifying graphic. The term representation is to be interpreted accordingly.

Figure 7:
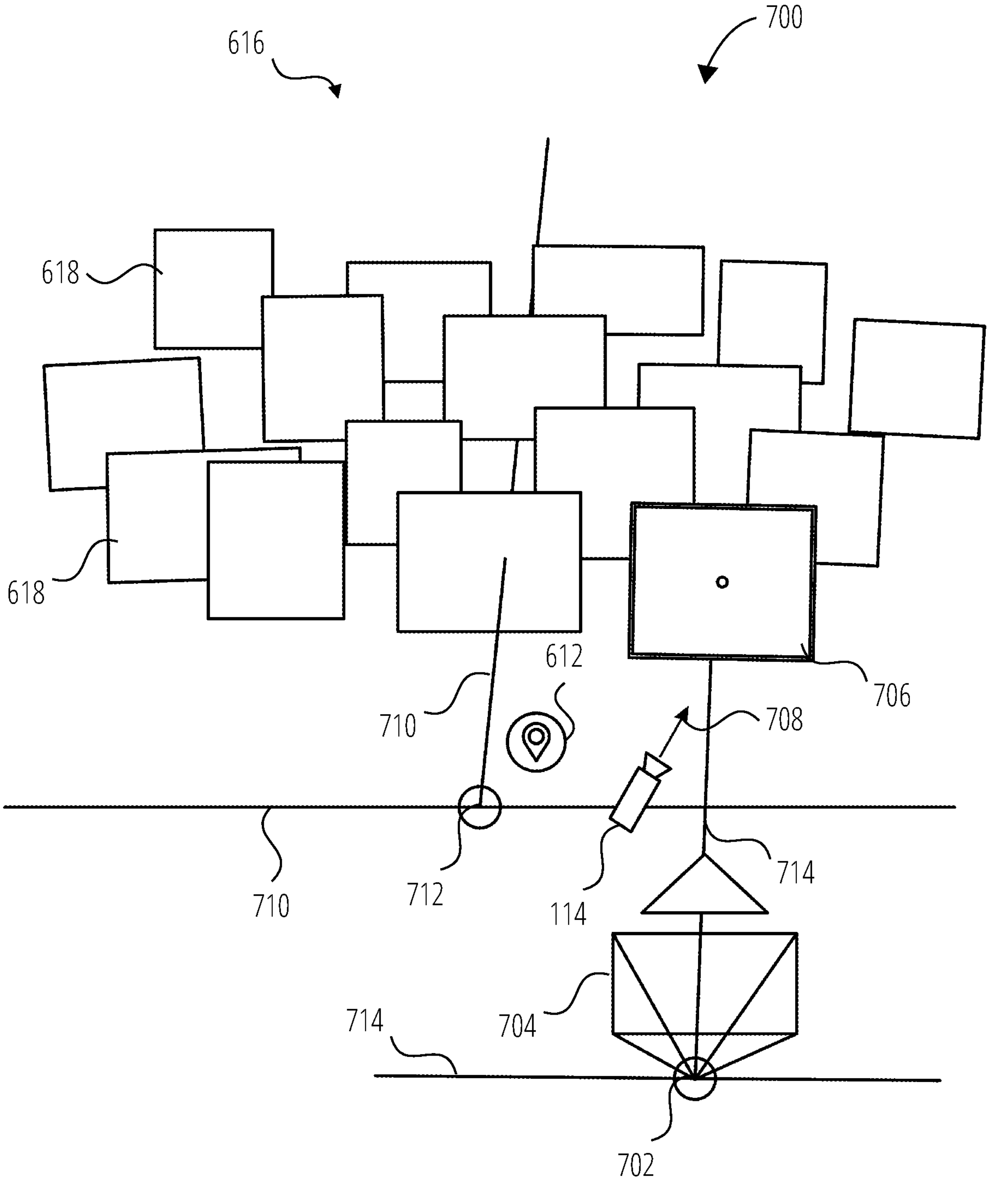
FIG. 7 illustrates a layout of a media gallery comprising a mood board, according to some examples.

FIG. 7 illustrates a layout 700 of a media gallery comprising a mood board 616, according to some examples. As can be seen, the mood board comprises a number of media items 618 that are arranged in rows within a field of view 704, seen from a glasses position 702. The mood board 616 has a frame of reference 710 that is normally fixed in the frame of reference of the real world, so that it will appear to remain stationary if the glasses position 702 moves, for example by the glasses 200 and thus the field of view 704 turning away from or moving away from the mood board 616. The frame of reference 710 of the mood board is defined by an anchor position 712 that has a position in the real-world, as well as an orientation in three axes relative to a real-world frame of reference.

Also shown in FIG. 7 is an anchor icon 612, which coincides with the anchor position 712 if the anchor position 712 is in the field of view of the glasses 200. If the anchor position 712 is not in the field of view of the glasses, the anchor icon 612 is rendered by the glasses 200 within its field of view, to permit its manipulation as described below, without the user having to look for it first. In such a case, the anchor icon 612 has a particular offset from the anchor position 712 in the frame of reference 710, and any manipulation of the anchor icon 612, such as movement thereof by the user, applies a corresponding movement to the anchor position 712 and thus to the mood board 616.

As described below with reference to FIG. 9, the anchor icon 612 can be selected by the user performing an appropriate gestures, such as a pinch gesture, in the proximity of the anchor icon 612. The glasses 200, recognizing the gesture and its proximity to the anchor icon 612 as discussed below, fixes the anchor icon 612 to the pinched fingers of the user, and moves the entire mood board 616 as the user moves their hand.

Additional user interface elements may also be displayed when the proximity of a user's hand to the anchor icon 612 is determined, for example a horizontally aligned AR ring that can be pinched and rotated to rotate the mood board 616 about a vertical axis. Permitted movement of the mood board 616 may be restricted to certain degrees of freedom. For example, the upright orientation of the mood board 616 may be fixed such that rotation of the mood board about a horizontal axis is not an available option. In other cases, the mood board 616 may be tiltable backwards or forwards by a limited amount.

The glasses 200 have a frame of reference 714 fixed to the glasses 200, with its origin at the glasses position 702. The field of view 704 of the glasses is thus also fixed relative to the frame of reference 714. The glasses 200 (and thus the frame of reference 714) has a position and orientation (pose) in the real-world frame of reference, determined by the position and orientation component 514. The appearance of the mood board 616 in the field of view 704 of the glasses 200 can thus be determined by the AR item placement system 432 as a transformation of the items in the mood board 616 from the frame of reference 710 into the real world frame of reference, followed by a transformation of the mood board 616 from the real world frame of reference into the frame of reference 714 of the glasses 200.

Also shown in FIG. 7 is a mobile device 114 that has been used to select a media item 706 or an open position for a media item 706 by pointing the mobile device 114 at the (open position for) a media item 706. This selection is performed by the glasses 200 or the mobile device 114 determining the pose of the mobile device 114 in the frame of reference of the real world (for example the environment 602), and determining an intersection of a line in a direction 708 in which the mobile device 114 is pointing. In some examples, the direction 708 may be illustrated by an AR reality object in the form of a beam or line emanating from the mobile device 114 in the direction 708, rendered by the glasses 200.

Figure 8:
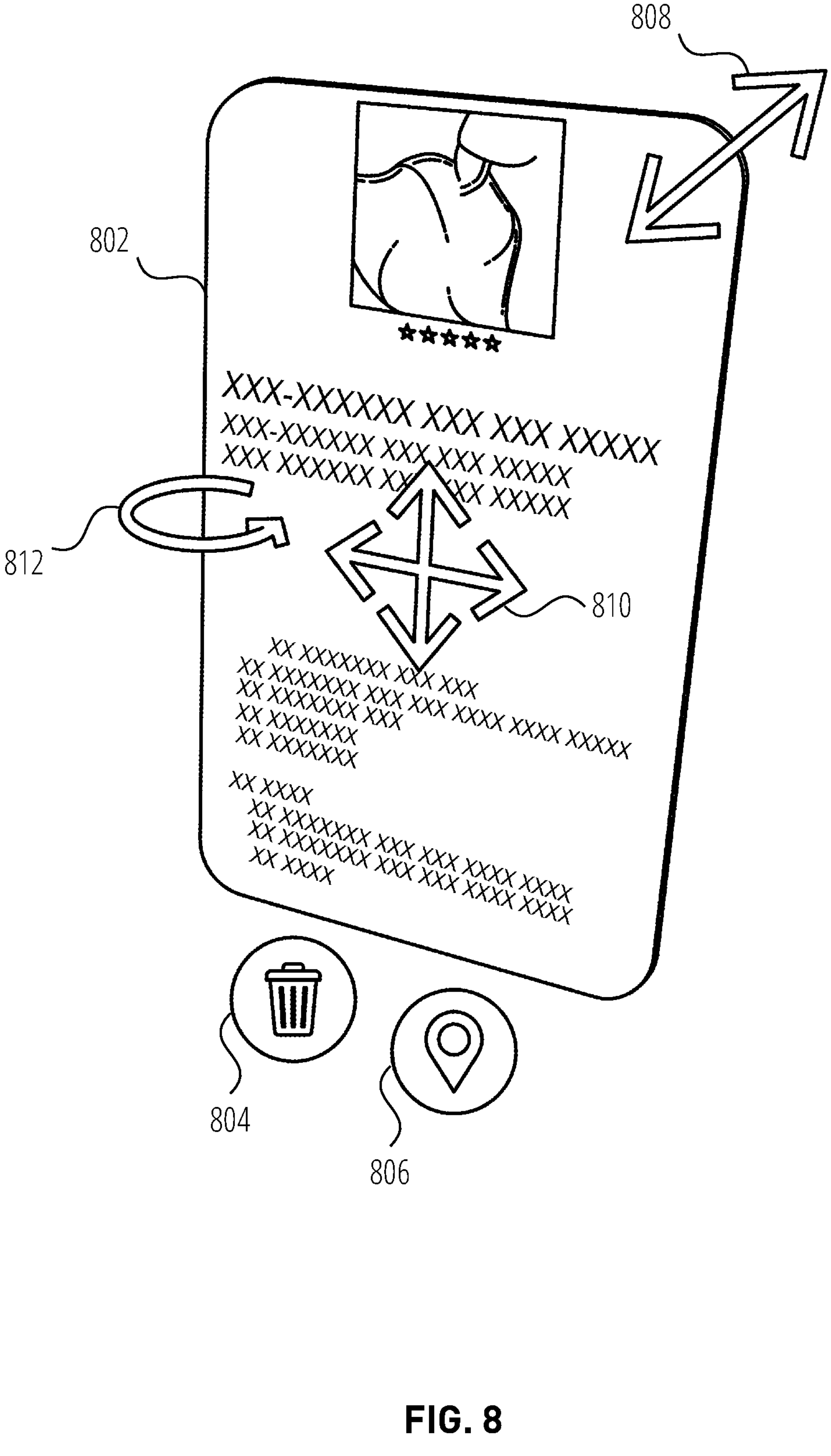
FIG. 8 illustrates displayed user interface elements for a media item that may be found in a mood board, according to some examples.

FIG. 8 illustrates displayed user interface elements for a media item 802 that may be found in a mood board 616, according to some examples. As can be seen, the user interface elements comprise a delete icon 804 appearing as a trash can, a mood board anchor icon 806 appearing as a map pin, a resize icon 808 appearing as an angled double-sided arrow, a move icon 810 appearing as crossed arrows, and a rotate icon 812 appearing as a ring.

The resize icon 808, the move icon 810, the rotate icon 812 and the delete icon 804 are in fixed positions relative to the media item 802, namely on the upper right corner of the media item 802 for the resize icon 808, at the center of the media item 802 for the move icon 810, intersecting the left edge of the media item 802 for the rotate icon 812 and just below the media item 802 for the delete icon 804. The delete icon 804, the resize icon 808, move icon 810 and the rotate icon 812 will be rendered in position at or on the media item 802 when a user's hand is detected in the apparent proximity of the media item 802, but these user interface elements will otherwise not be show, to preserve the aesthetic appearance of the mood board 616.

The display and location of the mood board anchor icon 806 is however persistent and in some examples may not be visible during close viewing of a particular media item 618 that is not near the mood board anchor icon 806. In other examples, a temporary local representation of the mood board anchor icon 806 may be displayed near a media item, to permit immediate movement of the entire mood board 616 at any time by the receipt of user input selecting and dragging the local representation of the mood board anchor icon 806 to a new location. The relative position of all of the media items 618 in the real-world environment 602 will then be adjusted according based on movement of the temporary representation of the mood board anchor icon 806.

Various gestures can be detected by the glasses 200 to select the user interface elements, such as a tap on or near a particular user interface element, or a pinch gesture near a particular user interface element. Detection of subsequent movement of a finger or of the pinched thumb and finger will result in corresponding changes being made to the media item 802 or the mood board 616. In the illustrated examples, pinching and dragging the mood board anchor icon 806 will reposition the entire mood board 616. Pinching and dragging the resize icon 808 away from the center of the media item 802 will make the media item 802 larger, and vice versa. Pinching and dragging the move icon 810 will move the media item 802 relative to the mood board 616. Pinching and dragging the rotate icon 812 in a horizontal direction perpendicular to the plane of the media item 802 will rotate the media item 802 around a central vertical axis.

Selection of the delete icon 804 by a tap or pinch gesture will result in a confirmation dialog box or other visual or audible prompt, requesting confirmation or dismissal of the deletion request. Upon receipt of confirmation of the request, the media item 802 will be removed from the mood board 616.

Figure 9:
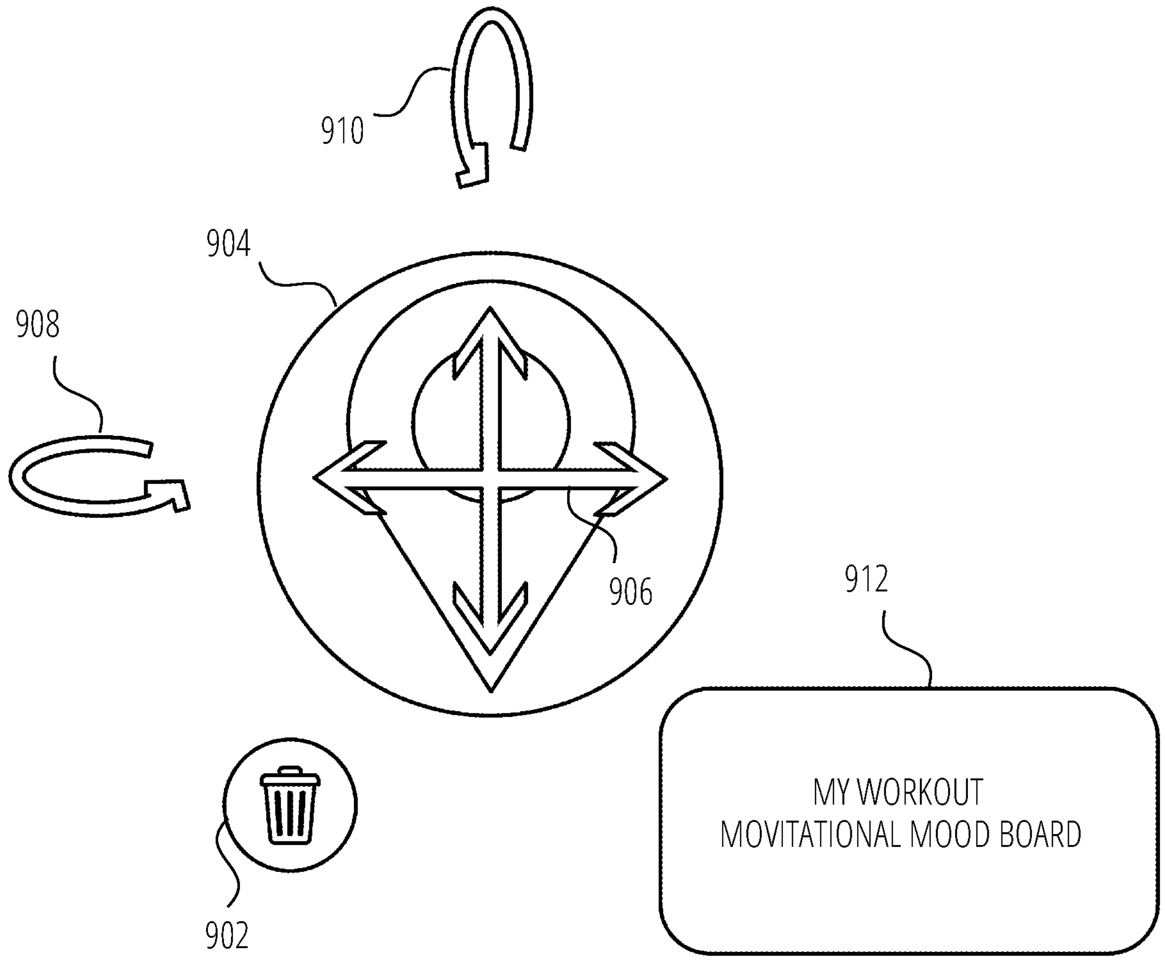
FIG. 9 illustrates displayed user interface elements for an anchor icon that may be found in a mood board, according to some examples.

FIG. 9 illustrates displayed user interface elements for the anchor icon 612 that may be found in a mood board 616, according to some examples. As can be seen, the user interface elements comprise a delete icon 902 appearing as a trash can, a move icon 906 appearing as crossed arrows, and two rotate icons 908, 910, appearing as a ring elements. Also shown is a text box 912 including bibliographic information about the mood board 616.

Some or all of these user interface elements will be rendered by the glasses 200 upon detection of one of the user's hands 614 in the proximity of the anchor icon 904. Various gestures can then be detected by the glasses 200 to select the user interface elements, such as a tap on or near a particular user interface element, or a pinch gesture near a particular user interface element.

Detection of subsequent movement of a finger or of the pinched thumb and finger will result in corresponding changes being made to the mood board 616. In the illustrated examples, pinching and dragging the anchor icon 904 will reposition the entire mood board 616. Pinching and dragging the rotate icon 910 towards or away from the glasses 200 will rotate the mood board 616 around a central vertical axis to the right or left respectively. Pinching and dragging the rotate icon 910 towards or away from the glasses 200 will tilt the mood board 616 down or up about a horizonal axis parallel to the front of the mood board 616.

Selection of the delete icon 902 by a tap or pinch gesture will result in a confirmation dialog box or other visual or audible prompt, requesting confirmation or dismissal of the deletion request. Upon receipt of confirmation of the request, the mood board 616 will be deleted. Other user interface elements may include "compact view" and minimize/hide to reduce the size or temporarily stop the display of the media items 618 in the mood board respectively. In such a case the mood board anchor icon 806, 904 will remain visible at the anchor location to provide a reminder of the existence of the mood board, which can be maximized by selection of a corresponding user interface item associated with the anchor icon 612.

The text box 912 includes identifying or other bibliographic information specified by the user, such as the user's name and the mood or theme of the mood board 616, such as "Summer 2023" or "Yoga Tranquility" or "Workout Motivation" and so forth. Selection of the text box 912 permits editing of the text in the text box 912 to update the identifying or other bibliographic information.

A number of mood boards 616 can be associated with a particular user for providing different media collections in different physical locations. For example, a mood board including workout or yoga or sporting photos or nature scenes may be placed by the user at or near an exercise location or yoga mat, to provide motivation or tranquility, while another mood board with creative sketches or relational diagrams may be placed at a home office or work office location.

Additionally, more than one mood board 616 can be located at or near the same physical location, and the particular mood board 616 that is displayed can be selected by the user by minimizing or maximizing particular mood boards using the interface elements associated with the various anchor icons 904. In such a case, each minimized media board's anchor icon 904 will be fixed to its corresponding anchor position 712, so that it is only visible at the location of the anchor position 712, to avoid cluttering the display presented to the user of the glasses 200 with anchor icons 904.

Different mood boards at the same location can also be displayed or maximized automatically based on contextual information such as time of day (bright and cheerful images in the morning, tranquil images in the evening, news items from various feeds in the morning or evening), the local weather, the user's schedule, and so forth. For example, in a room that has both a home office and exercise equipment, an exercise related mood board can be maximized after hours or from shortly before a scheduled or routine exercise session, while a work-related mood board can be maximized during office hours.

Figure 10:
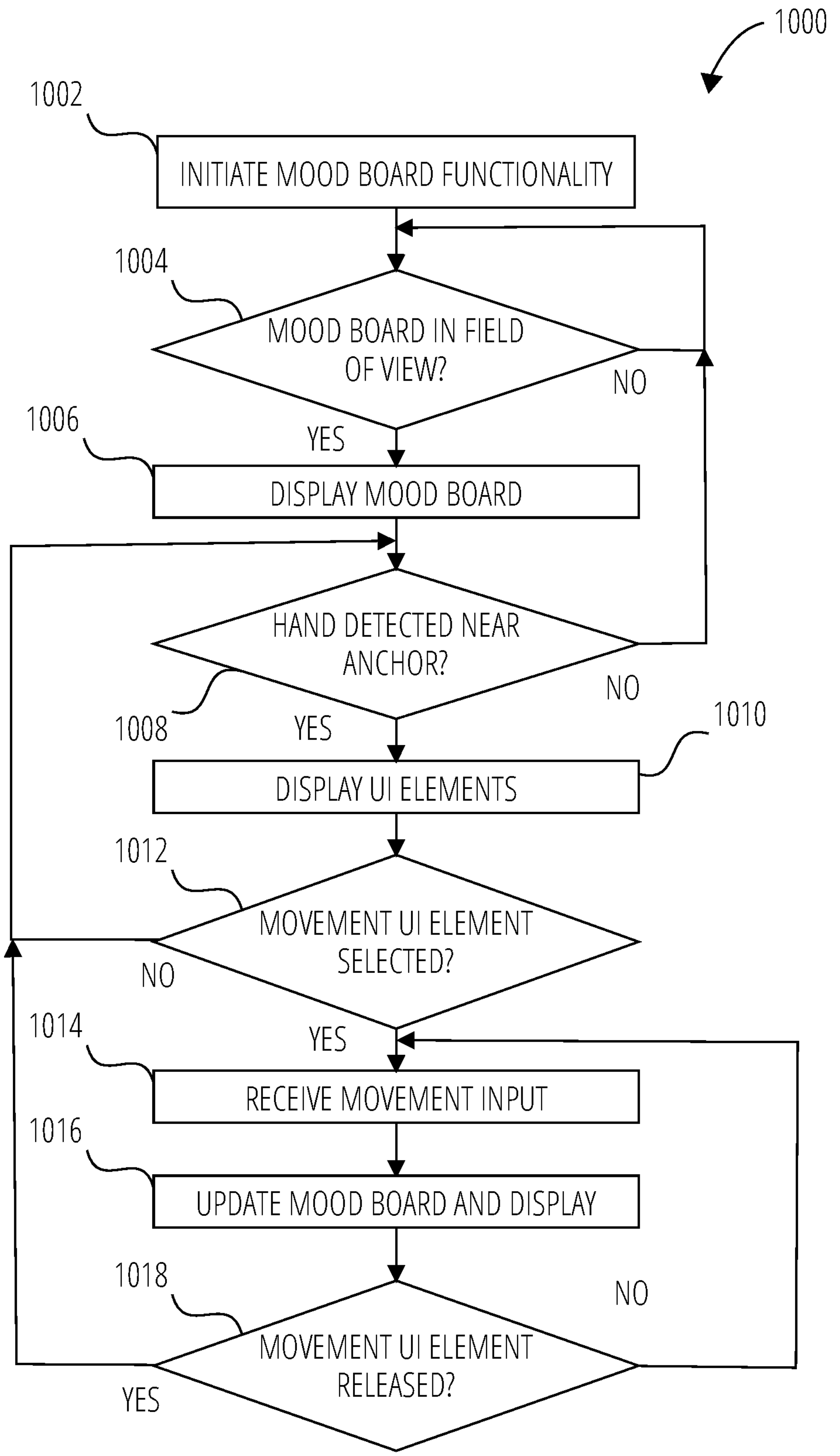
FIG. 10 is a flowchart illustrating a method of interacting with or manipulating one or more mood boards, according to some examples.

FIG. 10 is a flowchart 1000 illustrating a method of interacting with or manipulating one or more mood boards 616, according to some examples. For explanatory purposes, the operations of the flowchart 1000 are described herein as occurring in serial, or linearly. However, multiple operations of the flowchart 1000 may occur in parallel. In addition, the operations of the flowchart 1000 need not be performed in the order shown and/or one or more blocks of the flowchart 1000 need not be performed and/or can be replaced by other operations. The operations of the flowchart 1000 may be performed by the glasses 200, the mobile device 114, the interaction server system 110, or some combination thereof. The flowchart 1000 is performed by the AR item placement system 432 of the glasses 200 in some examples, although one or more of the operations may be performed by the mobile device 114 or a remote web server 130.

The flowchart 1000 commences at operation 1002 with the glasses 200 and optionally the mobile device 114 initiating mood board functionality. This may for example be in response to user input selecting a mood board option in an application 106 running on the mobile device 114 or in response to a mood board creation or editing function being selected in a user interface presented by the glasses 200. The initiation of mood board functionality may also be triggered by contextual factors, for example if a user is wearing the glasses 200 and is in the vicinity of and facing towards a mood board 616 as determined by the location of a mood board anchor icon 806, 904.

At operation 1004, the glasses 200 determine whether all or part (that is, one or more media items 618) of a mood board 616 is within its field of view based on a comparison between the relative poses (positions and orientations) of the media mood board 616 and the glasses 200. If the media mood board 616 is not in the field of view of the glasses, the glasses continue monitoring the relative poses of the glasses 200 and the mood board 616.

If the mood board 616 is within the field of view of the glasses 200, the visible part of the mood board 616 is displayed on the near eye displays 306, 316 of the glasses 200 in operation 1006 so as to appear to the user of the glasses 200 to be displayed at the physical location associated with the anchor position 712. The appearance of the mood board and associated elements such as an anchor icon 612, 904 and autolayout button 620 will be displayed by the glasses 200 as discussed above.

In operation 1008 the glasses 200 determine whether a user's hand 614 is in the vicinity of the anchor icon 612, 904. If not, the method returns to operation 1004 and proceeds from there. If the user's hand 614 is in the vicinity of the anchor icon 612, 904 then the method proceeds to operation 1010 with display of the user interface elements associated with the anchor icon 612, 904 as described above with reference to FIG. 9.

The glasses 200 then determine in operation 1012 whether or not a selection gesture, such as a pinch performed by a thumb and forefinger, has been performed at or sufficiently close to a user interface element. If not, the method returns to operation 1008 and proceeds from there. If a movement UI element has been selected (such as one of mood board anchor icons 806, 904; rotate icons 812, 908, 910; resize icon 808; move icons 810, move icon 906 and so forth), the movement of the user's hand is tracked by the glasses 200 in operation 1016 to provide user input to the mood board 616 or one of the media items 618.

The glasses 200 then perform the related update to the mood board 616 and display an updated mood board 616 based on the input received in operation 1016. In the case of movement input relating to the entire mood board 616, such as translation of a mood board anchor icon 806, 904 by selection and movement of the move icon 906, or rotation of the mood board 616 by selection and movement of a rotate icons 908, 910, the corresponding translation or rotation is applied to the entire frame of reference 710 of the mood board 616 in the real-world frame of reference. The position of the media items 618, which remain fixed in the frame of reference 710 of the mood board 616, will thus all be subject to a corresponding movement or rotation based on the input and the position of each media item 618 in the mood board 616.

That is, perceived movement of the mood board anchor icon 806, 904 as displayed to the user by the glasses 200, will result in corresponding movement of the mood board anchor position 712 in the real world, which will in turn result in corresponding movement of all of the media items 618 in the mood board 616 as they appear to the user. The relative positions of the media items 618 in the mood board 616 is maintained.

Similarly, perceived movement of one of the rotate icons 908, 910 towards or away from the glasses 200, as displayed to the user by the glasses 200, will result in corresponding rotation of the mood board frame of reference 710 about the anchor position 712 in the real world frame of reference, which will in turn result in corresponding rotation and translation of all of the media items 618 in the mood board 616 as they appear to the user. The relative positions of the media items 618 in the mood board 616 is maintained within the frame of reference. Accordingly, while all media items 618 rotate by the same amount in the real-world frame of reference, there will be a different translation of each media item 618 in the real world frame of reference based on how far each media item 618 is from anchor position 712, with media items 618 further from the anchor position 712 moving further than media items 618 closer to the anchor position 712.

The glasses 200 then determine in operation 1018 whether the selection gesture has been released, such as the user's thumb and forefinger moving apart to release a pinch gesture, in operation 1018. If not, the glasses continue to receive move input and continue to update the mood board 616 and its display in operations 1014 and 1016. If so, the method returns to operation 1008 and proceeds from there.

The method proceeds as above, until mood board functionality is terminated. This may for example be as a result of specific user input to terminate mood board functionality, or based on contextual information, such as the glasses 200 no longer being in the vicinity of a mood board, and so forth.

Figure 11:
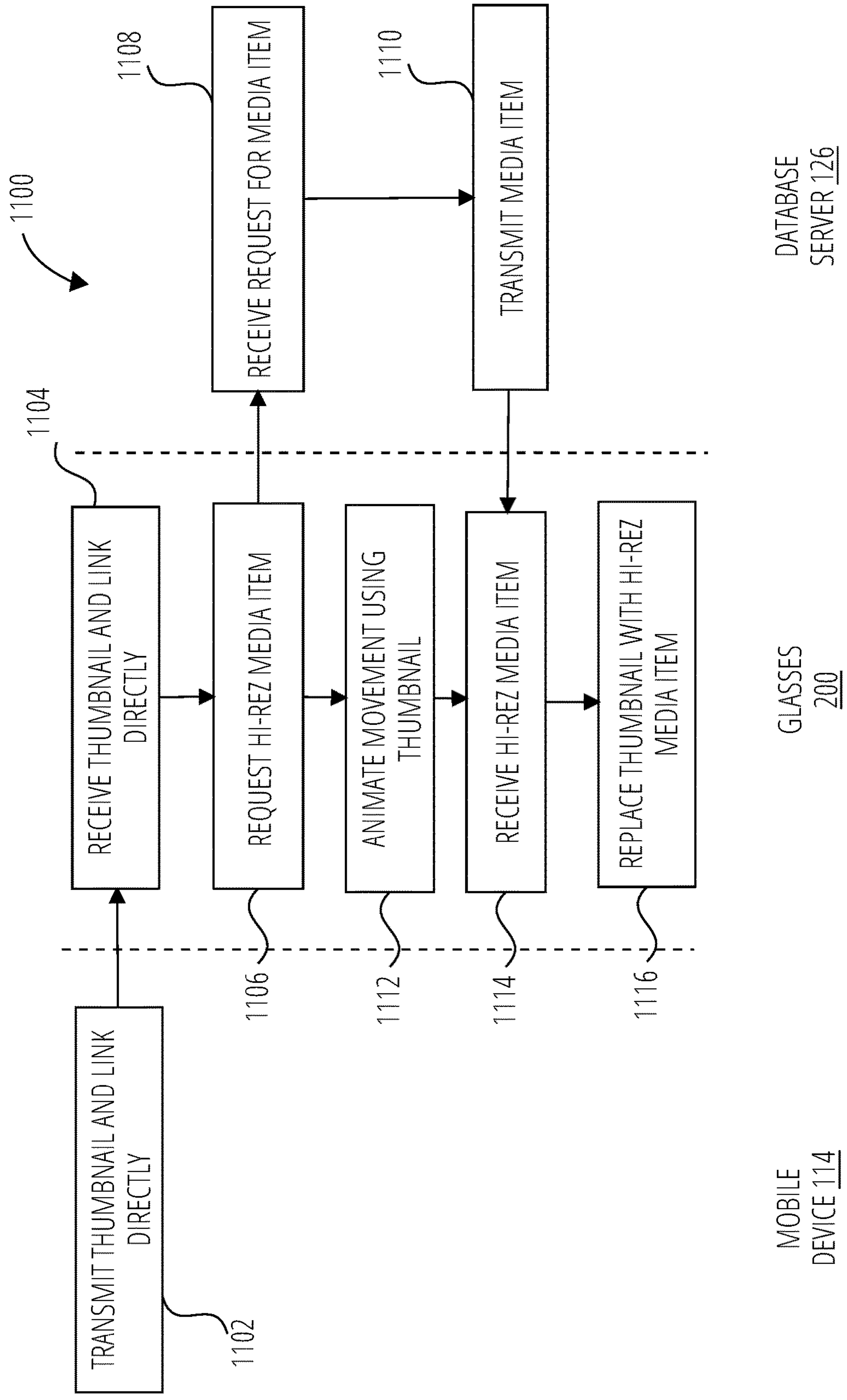
FIG. 11 is a flowchart illustrating a method of transmitting a media item from a mobile device to a head-worn device, according to some examples.

FIG. 11 is a flowchart 1100 illustrating a method of transmitting a media item from a mobile device 114 to a head-worn device 116, according to some examples. For explanatory purposes, the operations of the flowchart 1100 are described herein as occurring in serial, or linearly. However, multiple operations of the flowchart 1100 may occur in parallel. In addition, the operations of the flowchart 1100 need not be performed in the order shown and/or one or more blocks of the flowchart 1100 need not be performed and/or can be replaced by other operations. The operations of the flowchart 1100 is performed by a combination of the glasses 200, the mobile device 114, and the database server 126 of the interaction server system 110.

The flowchart 1100 commences at operation 1102 with direct transmission by the mobile device 114 of a thumbnail representation of a selected media item, and a link to a full or higher-resolution representation of the selected media item, from the mobile device 114 to the glasses 200. This is performed via a short-range data transmission, using for example a Bluetooth link, which has previously been established for communication between the mobile device 114 and the glasses 200. Any available direct communication link between the mobile device 114 and the glasses 200 can be used for this transmission.

The thumbnail representation of the selected media item and the link to a full or higher-resolution representation of the selected media item is received by the glasses 200 at operation 1104. At operation 1106, the glasses 200 transmit a request for the selected media item at operation 1108, over the network 108. The glasses 200 then proceed to animate the movement of the selected media item into the mood board 616 on its near eye displays 306, 316, using the thumbnail representation of the selected media item in operation 1112.

The database server 126 of the interaction server system 110, which hosts an online representation of the user's camera roll 622 in a database 128, receives the request for the selected media item over the network 108 in operation 1108. The database server 126 retrieves the selected media item from the database 128 and transmits the selected media item to the glasses 200 over the network 108 in operation 1110.

The glasses 200 receive the full or higher-resolution representation of the selected media item at operation 1114, and in operation 1116 the glasses 200 replace the thumbnail representation of the media item with the full or higher-resolution representation of the selected media item.

Various examples are contemplated.

Example 1 is a system comprising: a head-worn device; and at least one processor and at least one memory storing instructions; wherein the instructions stored by the at least one memory, when executed by the at least one processor, configure the system to perform operations for manipulating a gallery of extended reality (XR) media items, the operations comprising: causing display of the gallery of XR media items in a field of view of the head-worn device, the gallery of XR media items being associated with an anchor user interface element; detecting a user selection input at a perceived location of the anchor user interface element; determining user motion input; and based on the user motion input, moving the perceived location or orientation of the gallery of XR media items in the field of view of the head-worn device.

In Example 2, the subject matter of Example 1 includes, wherein the user selection input comprises selection of a rotation user interface element associated with the anchor user interface element, and the moving of the perceived location or orientation of the gallery of XR media items in the field of view of the head-worn device comprises rotating the gallery of XR media items relative to the anchor user interface element.

In Example 3, the subject matter of Example 2 includes, wherein the rotation user interface element is offset from the anchor user interface element and the rotating of the gallery of XR media items is based on user motion input comprising movement towards or away from the head-worn device.

In Example 4, the subject matter of any one of Examples 1-3 includes, wherein the user selection input comprises selection of a movement user interface element associated with the anchor user interface element, and the moving of the perceived location or orientation of the gallery of XR media items in the field of view of the head-worn device comprises translating the gallery of XR media items.

In Example 5, the subject matter of Example 4 includes, wherein the user selection input comprises a pinch gesture performed by a hand of a user at a first location, the operations further comprising: tracking movement of the hand while the pinch gesture is maintained; determining that the pinch gesture has been released at a second location; and causing display of the gallery of XR media items at the second location.

In Example 6, the subject matter of any one of Examples 1-5 includes, wherein a position and orientation of each media item in the gallery of XR media items is specified in a gallery frame of reference defined with respect to an anchor position, and wherein moving the perceived location or orientation of the gallery of XR media items in the field of view of the head-worn device comprises moving a location or orientation of the gallery frame of reference relative to a real-world frame of reference.

In Example 7, the subject matter of any one of Examples 1-6 includes, wherein a position and orientation of each media item in the gallery of XR media items is specified in a gallery frame of reference defined with respect to an anchor position, wherein the operations further comprise: determining that the anchor position is not within the field of view of the head-worn device; and based on determining that the anchor position is not within the field of view of the head-worn device, causing display of the anchor user interface element at a position in the field of view of the head-worn device that is offset from the anchor position.

In Example 8, the subject matter of any one of Examples 1-7 includes, wherein the operations further comprise: receiving a pose of a mobile device; causing display of a beam from a top edge of the mobile device; determining an intersection of a line from the top edge of the mobile device with a particular item in the gallery of XR media items; and selecting the particular item in the gallery of XR media items.

Example 9 is a computer-implemented method for manipulating a gallery of extended reality (XR) media items, the method comprising: causing display of the gallery of XR media items in a field of view of a head-worn device, the gallery of XR media items being associated with an anchor user interface element; detecting a user selection input at a perceived location of the anchor user interface element; determining user motion input; and based on the user motion input, moving the perceived location or orientation of the gallery of XR media items in the field of view of the head-worn device.

In Example 10, the subject matter of Example 9 includes, wherein the user selection input comprises selection of a rotation user interface element associated with the anchor user interface element, and the moving of the perceived location or orientation of the gallery of XR media items in the field of view of the head-worn device comprises rotating the gallery of XR media items relative to the anchor user interface element.

In Example 11, the subject matter of Example 10 includes, wherein the rotation user interface element is offset from the anchor user interface element and the rotating of the gallery of XR media items is based on user motion input comprising movement towards or away from the head-worn device.

In Example 12, the subject matter of any one of Examples 9-11 includes, wherein the user selection input comprises selection of a movement user interface element associated with the anchor user interface element, and the moving of the perceived location or orientation of the gallery of XR media items in the field of view of the head-worn device comprises translating the gallery of XR media items.

In Example 13, the subject matter of any one of Examples 9-12 includes, receiving a pose of a mobile device; causing display of a beam from a top edge of the mobile device; determining an intersection of a line from the top edge of the mobile device with a particular item in the gallery of XR media items; and selecting the particular item in the gallery of XR media items.

In Example 14, the subject matter of any one of Examples 9-13 includes, wherein the user selection input comprises a pinch gesture performed by a hand of a user at a first location, further comprising: tracking movement of the hand while the pinch gesture is maintained; determining that the pinch gesture has been released at a second location; and causing display of the gallery of XR media items at the second location.

In Example 15, the subject matter of any one of Examples 9-14 includes, wherein a position and orientation of each media item in the gallery of XR media items is specified in a gallery frame of reference defined with respect to an anchor position, further comprising: determining that the anchor position is not within the field of view of the head-worn device; and based on determining that the anchor position is not within the field of view of the head-worn device, causing display of the anchor user interface element at a position in the field of view of the head-worn device that is offset from the anchor position.

Example 16 is a non-transitory computer-readable storage medium, the computer-readable storage medium including instructions that when executed by one or more processors, cause the one or more processors to perform operations for manipulating a gallery of extended reality (XR) media items, the operations comprising: causing display of the gallery of XR media items in a field of view of a head-worn device, the gallery of XR media items being associated with an anchor user interface element; detecting a user selection input at a perceived location of the anchor user interface element; determining user motion input; and based on the user motion input, moving the perceived location or orientation of the gallery of XR media items in the field of view of the head-worn device.

In Example 17, the subject matter of Example 16 includes, wherein the user selection input comprises selection of a rotation user interface element associated with the anchor user interface element, and the moving of the perceived location or orientation of the gallery of XR media items in the field of view of the head-worn device comprises rotating the gallery of XR media items relative to the anchor user interface element.

In Example 18, the subject matter of any one of Examples 16-17 includes, wherein the user selection input comprises selection of a movement user interface element associated with the anchor user interface element, and the moving of the perceived location or orientation of the gallery of XR media items in the field of view of the head-worn device comprises translating the gallery of XR media items.

In Example 19, the subject matter of any one of Examples 16-18 includes, wherein a position and orientation of each media item in the gallery of XR media items is specified in a gallery frame of reference defined with respect to an anchor position, wherein the operations further comprise: determining that the anchor position is not within the field of view of the head-worn device; and based on determining that the anchor position is not within the field of view of the head-worn device, causing display of the anchor user interface element at a position in the field of view of the head-worn device that is offset from the anchor position.

In Example 20, the subject matter of any one of Examples 16-19 includes, wherein the operations further comprise: receiving a pose of a mobile device; causing display of a beam from a top edge of the mobile device; determining an intersection of a line from the top edge of the mobile device with a particular item in the gallery of XR media items; and selecting the particular item in the gallery of XR media items.

Example 21 is at least one machine-readable medium including instructions that, when executed by processing circuitry, cause the processing circuitry to perform operations to implement of any one of Examples 1-20. Example 22 is an apparatus comprising means to implement of any one of Examples 1-20. Example 23 is a system to implement of any one of Examples 1-20. Example 24 is a method to implement of any one of Examples 1-20.

System with Head-Wearable Apparatus

Figure 12:
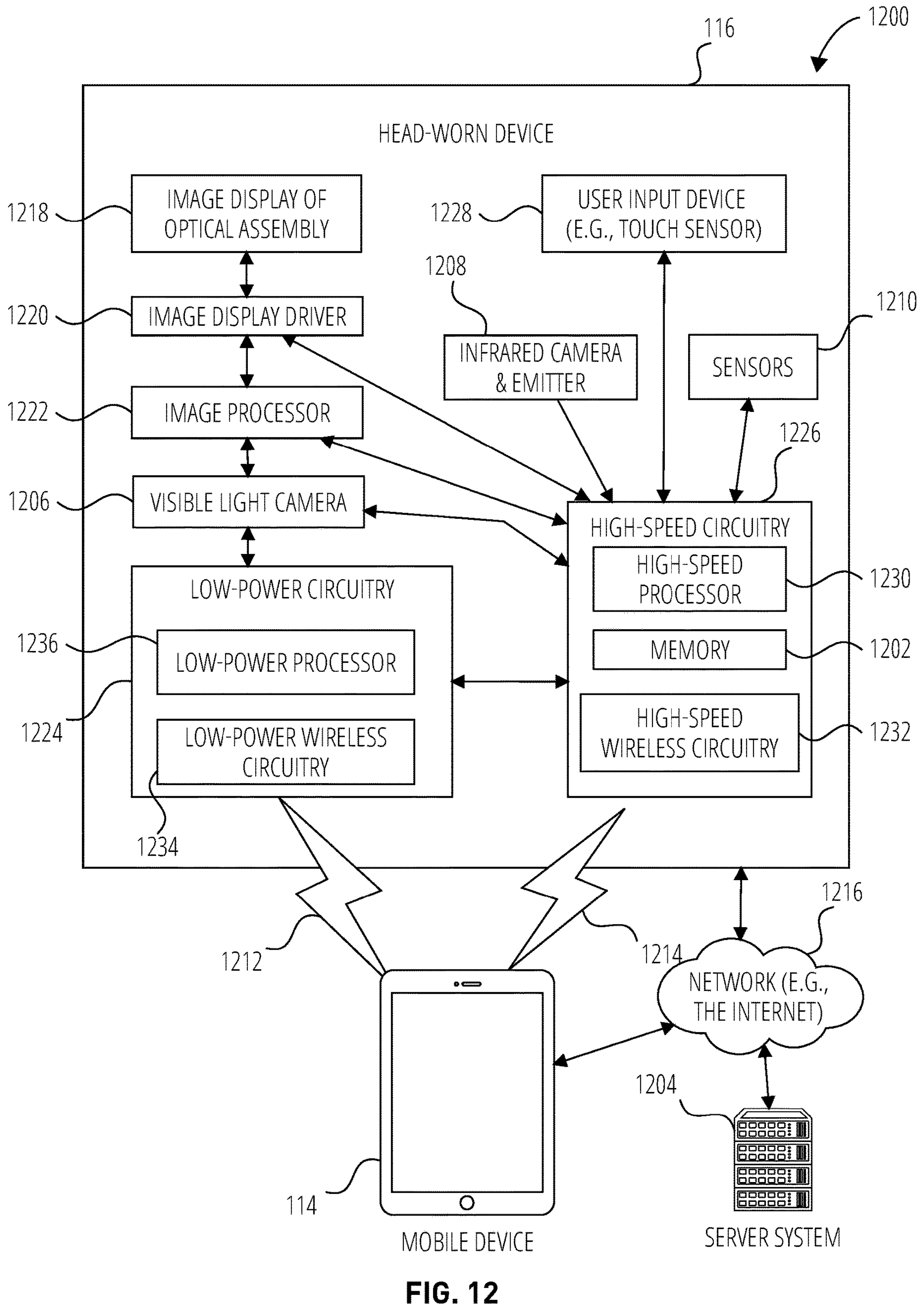
FIG. 12 illustrates a system including a head-worn device, according to some examples.

FIG. 12 illustrates a system 1200 including a head-worn device 116, according to some examples. FIG. 12 is a high-level functional block diagram of an example head-worn device 116 communicatively coupled to a mobile device 114 and various server systems 1204 (e.g., the interaction server system 110) via various networks 108.

The head-worn device 116 includes one or more cameras, each of which may be, for example, a visible light camera 1206, and an infrared camera & emitter 1208

The head-worn device 116 also includes sensors 1210, which may be the motion components 1330, position components 1334, environmental components 1332 and biometric components 1328 described below with reference to FIG. 13. In particular, motion components 1330 and position components 1334 are used by the head-worn device 116 to determine and keep track of the position and orientation (the "pose") of the head-worn device 116 relative to a frame of reference or another object, in conjunction with a video feed from one of the visible light cameras 1206, using for example techniques such as structure from motion (SfM) and or visual-inertial odometry (VIO).

Rendering of the virtual objects by the head-worn device 116 is performed by the AR item placement system 432 using the determined pose so that the virtual object correctly appears in the near eye displays 306, 316. As an example, the AR wearable device may render a virtual object associated with a physical object such that the virtual object may be perceived by the user as appearing to be aligned with the physical object. In another example, graphics (e.g., graphical elements containing information, instructions, and guides) appear to be attached to or overlaying a physical object of interest. To achieve this, the AR wearable device detects the physical object and tracks a pose of the AR wearable device relative to a position of the physical object.

The mobile device 114 connects with head-worn device 116 using both a low-power wireless connection 1212 and a high-speed wireless connection 1214. The mobile device 114 is also connected to the server system 1204 and the network 1216.

The head-worn device 116 further includes two image displays of the image display of optical assembly 1218. The two image displays of optical assembly 1218 include one associated with the left lateral side and one associated with the right lateral side of the head-worn device 116. The head-worn device 116 also includes an image display driver 1220, an image processor 1222, low-power circuitry 1224, and high-speed circuitry 1226. The image display of optical assembly 1218 is for presenting images and videos, including an image that can include a graphical user interface to a user of the head-worn device 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-worn device 116 includes a frame and stems (or temples) extending from a lateral side of the frame. The head-worn device 116 further includes a user input device 1228 (e.g., touch sensor or push button), including an input surface on the head-worn device 116. The user input device 1228 (e.g., touch sensor or push button) is to receive from the user an input selection to manipulate the graphical user interface of the presented image.

The components shown in FIG. 12 for the head-worn device 116 are located on one or more circuit boards, for example a PCB or flexible PCB, in the rims or temples. Alternatively, or additionally, the depicted components can be located in the chunks, frames, hinges, or bridge of the head-worn device 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-worn device 116 includes a memory 1202, which stores instructions to perform a subset or all of the functions described herein. The memory 1202 can also include storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-worn device 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-worn device 116, and the operating system is stored in the memory 1202 for execution. In addition to any other responsibilities, the high-speed processor 1230 executing a software architecture for the head-worn device 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as Wi-Fi. In some examples, other high-speed communications standards may be implemented by the high-speed wireless circuitry 1232.

The low-power wireless circuitry 1234 and the high-speed wireless circuitry 1232 of the head-worn device 116 can include short-range transceivers (Bluetooth™) and wireless wide, local, or wide area network transceivers (e.g., cellular or Wi-Fi). Mobile device 114, including the transceivers communicating via the low-power wireless connection 1212 and the high-speed wireless connection 1214, may be implemented using details of the architecture of the head-worn device 116, as can other elements of the network 1216.

The memory 1202 includes any storage device capable of storing various data and Applications, including, among other things, camera data generated by the left and right visible light cameras 1206, the sensors 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-worn device 116. In certain such examples, electrical routing lines may provide a connection through a chip that includes the high-speed processor 1230 from the image processor 1222 or the low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-worn device 116 can be coupled to the camera (visible light camera 1206, infrared camera & emitter 1208, or sensors 1210), the image display driver 1220, the user input device 1228 (e.g., touch sensor or push button), and the memory 1202.

The head-worn device 116 is connected to a host computer. For example, the head-worn device 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-worn device 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions for generating binaural audio content in the mobile device 114's memory to implement the functionality described herein.

Output components of the head-worn device 116 include visual components, such as a display such as a liquid crystal display (LCD), a plasma display panel (PDP), a light-emitting diode (LED) display, a projector, or a waveguide. The image displays of the optical assembly are driven by the image display driver 1220. The output components of the head-worn device 116 further include acoustic components (e.g., speakers), haptic components (e.g., a vibratory motor), other signal generators, and so forth. The input components of the head-worn device 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-worn device 116 may also include additional peripheral device elements. Such peripheral device elements may include biometric sensors, additional sensors, or display elements integrated with the head-worn device 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Machine Architecture

Figure 13:
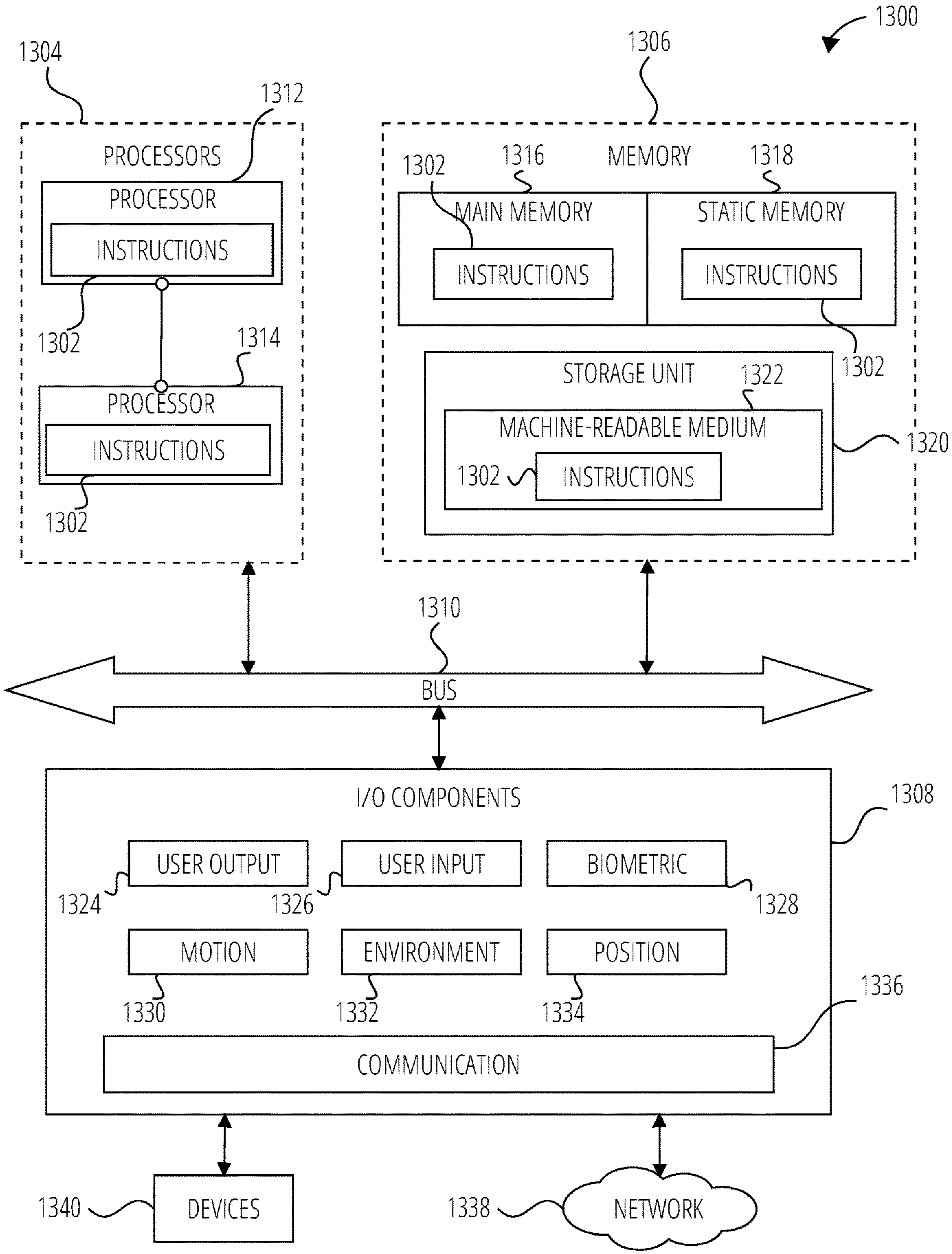
FIG. 13 is a diagrammatic representation of a machine in the form of a computer system within which a set of instructions may be executed to cause the machine to perform any one or more of the methodologies discussed herein, according to some examples.

FIG. 13 is a diagrammatic representation of the machine 1300 within which instructions 1302 (e.g., software, a program, an Application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies discussed herein. The machine 1300, for example, may comprise the user system 102 or any one of multiple server devices forming part of the interaction server system 110. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1308, which may be configured to communicate with each other via a bus 1310. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that execute the instructions 1302. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include Electroencephalography (EEG) based BMIs, which record electrical activity in the brain using electrodes placed on the scalp, invasive BMIs, which used electrodes that are surgically implanted into the brain, and optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1330 include acceleration sensor components (e.g., accelerometer), gravitation sensor components, rotation sensor components (e.g., gyroscope).

The environmental components 1332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

Figure 14:
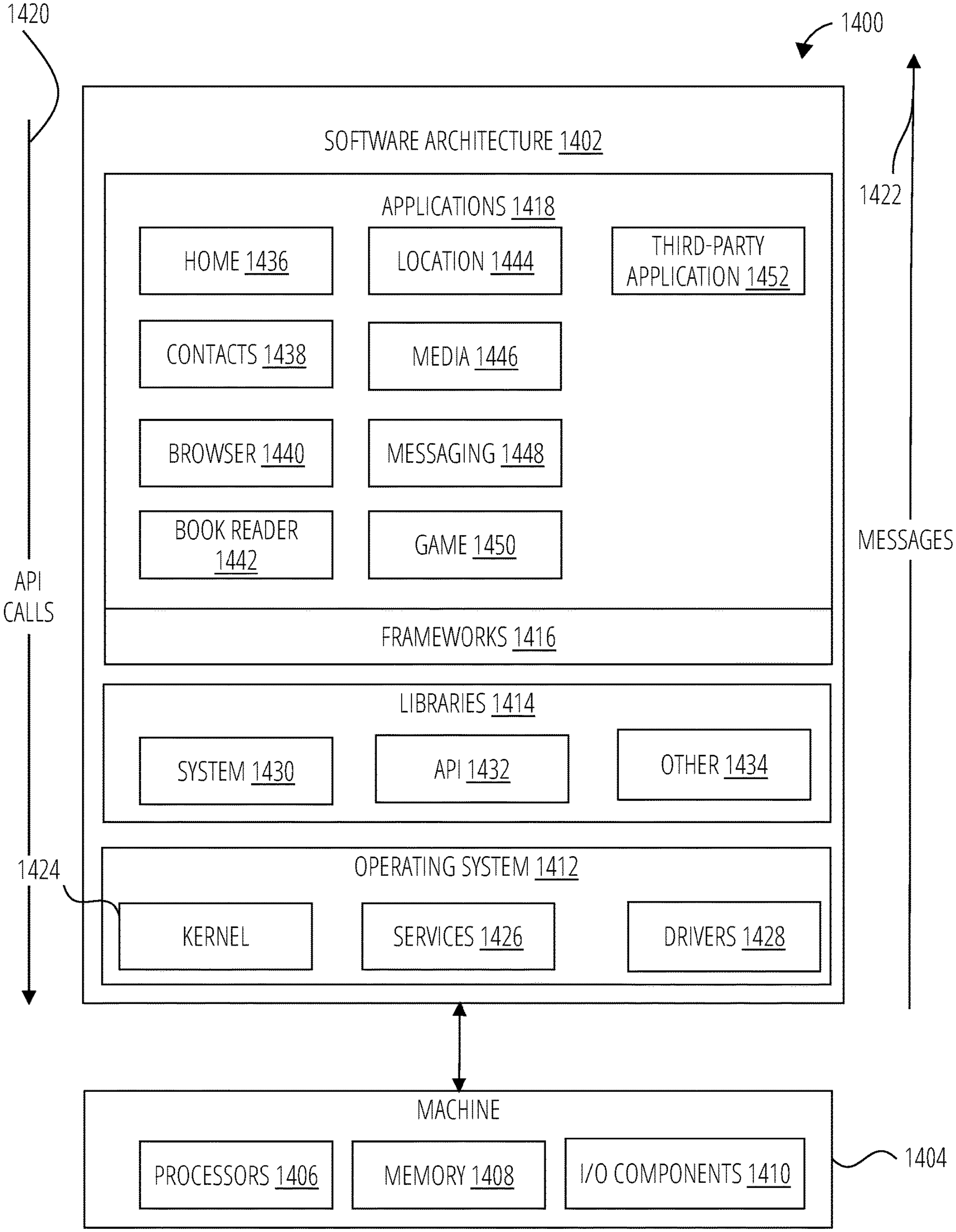
FIG. 14 is a block diagram showing a software architecture within which examples may be implemented.

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture 1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematic functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts Application 1438, a browser application 1440, a book reader application 1442, a location application 1444, a media application 1446, a messaging application 1448, a game application 1450, and a broad assortment of other Applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an Application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" or "user device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an Application or Application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an Application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

The invention claimed is:

1. A system comprising:

a head-worn device; and at least one processor and at least one memory storing instructions;

wherein the instructions stored by the at least one memory, when executed by the at least one processor, configure the system to perform operations for manipulating a gallery of extended reality (XR) media items, the operations comprising:

causing display of the gallery of XR media items in a field of view of the head-worn device via a near eye display of the head-worn device, a position and orientation of each XR media item in the gallery of XR media items being defined in a gallery frame of reference defined with respect to an anchor user interface element, the gallery of XR media items being arranged in an amphitheater layout comprising curved rows of XR media items that increase in height with distance from a viewpoint of a wearer of the head-worn device;

detecting a pinch gesture performed by a user's hand at a perceived location of the anchor user interface element;

determining user motion input by tracking movement of the user's hand while the pinch gesture is maintained; and based on the user motion input, moving the perceived location or orientation of the gallery of XR media items in the field of view of the head-worn device while maintaining relative positions and orientations of the XR media items to each other in the gallery frame of reference, and further wherein moving the perceived location or orientation of the gallery of XR media items comprises moving the position of the anchor user interface element in a real-world frame of reference such that each XR media item in the gallery undergoes a corresponding translation in the real-world frame of reference that varies based on a distance of each respective XR media item from the position of the anchor user interface element.

2. The system of claim 1, wherein the pinch gesture is performed at a rotation user interface element offset from the anchor user interface element, and the moving of the perceived location or orientation of the gallery of XR media items in the field of view of the head-worn device comprises rotating the gallery of XR media items relative to the anchor user interface element in response to linear movement of the rotation user interface element.

3. The system of claim 2, wherein the rotation user interface element is offset from the anchor user interface element and the rotating of the gallery of XR media items is based on user motion input comprising movement towards or away from the head-worn device.

4. The system of claim 1, wherein the pinch gesture is performed at a linear movement user interface element associated with the anchor user interface element, and the moving of the perceived location or orientation of the gallery of XR media items in the field of view of the head-worn device comprises linearly translating the gallery of XR media items.

5. The system of claim 4, wherein the pinch gesture is performed by a hand of a user at a first location, the operations further comprising:

determining that the pinch gesture has been released at a second location; and causing display of the gallery of XR media items at the second location.

6. The system of claim 1, wherein moving the perceived location or orientation of the gallery of XR media items in the field of view of the head-worn device comprises moving a location or orientation of the gallery frame of reference relative to a real-world frame of reference.

7. The system of claim 1, wherein a position and orientation of each media item in the gallery of XR media items is specified in a gallery frame of reference defined with respect to an anchor position, wherein the operations further comprise:

determining that the anchor position is not within the field of view of the head-worn device; and based on determining that the anchor position is not within the field of view of the head-worn device, causing display of the anchor user interface element at a position in the field of view of the head-worn device that is offset from the anchor position.

8. The system of claim 1, wherein the operations further comprise:

receiving a pose of a mobile device;

causing display of a beam from a top edge of the mobile device;

determining an intersection of a line from the top edge of the mobile device with a particular item in the gallery of XR media items; and selecting the particular item in the gallery of XR media items.

9. A computer-implemented method for manipulating a gallery of extended reality (XR) media items, the method comprising:

causing display of the gallery of XR media items in a field of view of a head-worn device via a near eye display of the head-worn device, a position and orientation of each XR media item in the gallery of XR media items being defined in a gallery frame of reference defined with respect to an anchor user interface element, the gallery of XR media items being arranged in an amphitheater layout comprising curved rows of XR media items that increase in height with distance from a viewpoint of a wearer of the head-worn device;

detecting a pinch gesture performed by a user's hand at a perceived location of the anchor user interface element;

determining user motion input by tracking movement of the user's hand while the pinch gesture is maintained; and based on the user motion input, moving the perceived location or orientation of the gallery of XR media items in the field of view of the head-worn device while maintaining relative positions and orientations of the XR media items to each other in the gallery frame of reference, and further wherein moving the perceived location or orientation of the gallery of XR media items comprises moving the position of the anchor user interface element in a real-world frame of reference such that each XR media item in the gallery undergoes a corresponding translation in the real-world frame of reference that varies based on a distance of each respective XR media item from the position of the anchor user interface element.

10. The computer-implemented method of claim 9, wherein the pinch gesture is performed at a rotation user interface element offset from the anchor user interface element, and the moving of the perceived location or orientation of the gallery of XR media items in the field of view of the head-worn device comprises rotating the gallery of XR media items relative to the anchor user interface element in response to linear movement of the rotation user interface element.

11. The computer-implemented method of claim 10, wherein the rotation user interface element is offset from the anchor user interface element and the rotating of the gallery of XR media items is based on user motion input comprising movement towards or away from the head-worn device.

12. The computer-implemented method of claim 9, wherein the pinch gesture is performed at a linear movement user interface element associated with the anchor user interface element, and the moving of the perceived location or orientation of the gallery of XR media items in the field of view of the head-worn device comprises linearly translating the gallery of XR media items.

13. The computer-implemented method of claim 12, wherein the pinch gesture is alternatively performable at a rotation user interface element offset from the anchor user interface element, and the moving of the perceived location or orientation of the gallery of XR media items in the field of view of the head-worn device comprises rotating the gallery of XR media items relative to the anchor user interface element in response to linear movement of the rotation user interface element.

14. The computer-implemented method of claim 9, wherein the pinch gesture is performed by a hand of a user at a first location, further comprising:

determining that the pinch gesture has been released at a second location; and causing display of the gallery of XR media items at the second location.

15. The computer-implemented method of claim 9, wherein a position and orientation of each media item in the gallery of XR media items is specified in a gallery frame of reference defined with respect to an anchor position, further comprising:

determining that the anchor position is not within the field of view of the head-worn device; and based on determining that the anchor position is not within the field of view of the head-worn device, causing display of the anchor user interface element at a position in the field of view of the head-worn device that is offset from the anchor position.

16. A non-transitory computer-readable storage medium, the computer-readable storage medium including instructions that when executed by one or more processors, cause the one or more processors to perform operations for manipulating a gallery of extended reality (XR) media items, the operations comprising:

causing display of the gallery of XR media items in a field of view of a head-worn device via a near eye display of the head-worn device, a position and orientation of each XR media item in the gallery of XR media items being defined in a gallery frame of reference defined with respect to an anchor user interface element, the gallery of XR media items being arranged in an amphitheater layout comprising curved rows of XR media items that increase in height with distance from a viewpoint of a wearer of the head-worn device;

detecting a pinch gesture performed by a user's hand at a perceived location of the anchor user interface element;

determining user motion input by tracking movement of the user's hand while the pinch gesture is maintained; and based on the user motion input, moving the perceived location or orientation of the gallery of XR media items in the field of view of the head-worn device while maintaining relative positions and orientations of the XR media items to each other in the gallery frame of reference, and further wherein moving the perceived location or orientation of the gallery of XR media items comprises moving the position of the anchor user interface element in a real-world frame of reference such that each XR media item in the gallery undergoes a corresponding translation in the real-world frame of reference that varies based on a distance of each respective XR media item from the position of the anchor user interface element.

17. The non-transitory computer-readable storage medium of claim 16, wherein the pinch gesture is performed at a rotation user interface element offset from the anchor user interface element, and the moving of the perceived location or orientation of the gallery of XR media items in the field of view of the head-worn device comprises rotating the gallery of XR media items relative to the anchor user interface element in response to linear movement of the rotation user interface element.

18. The non-transitory computer-readable storage medium of claim 16, wherein the pinch gesture is performed at a linear movement user interface element associated with the anchor user interface element, and the moving of the perceived location or orientation of the gallery of XR media items in the field of view of the head-worn device comprises linearly translating the gallery of XR media items.

19. The non-transitory computer-readable storage medium of claim 16, wherein a position and orientation of each media item in the gallery of XR media items is specified in a gallery frame of reference defined with respect to an anchor position, wherein the operations further comprise:

determining that the anchor position is not within the field of view of the head-worn device; and based on determining that the anchor position is not within the field of view of the head-worn device, causing display of the anchor user interface element at a position in the field of view of the head-worn device that is offset from the anchor position.

20. The non-transitory computer-readable storage medium of claim 16, wherein the pinch gesture is performed by a hand of a user at a first location, further comprising:

determining that the pinch gesture has been released at a second location; and causing display of the gallery of XR media items at the second location.

* * * * *